United States Patent
Kamimura et al.

(10) Patent No.: US 11,842,752 B2
(45) Date of Patent: *Dec. 12, 2023

(54) MAGNETIC TAPE CONTAINER

(71) Applicant: FUJIFILM Corporation, Tokyo (JP)

(72) Inventors: Shota Kamimura, Minamiashigara (JP); Yuto Murata, Minamiashigara (JP); Tomohide Ueyama, Minamiashigara (JP); Norihito Kasada, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,961

(22) Filed: Feb. 25, 2022

(65) Prior Publication Data
US 2022/0277770 A1 Sep. 1, 2022

(30) Foreign Application Priority Data
Feb. 26, 2021 (JP) .................. 2021-030915

(51) Int. Cl.
*G11B 23/107* (2006.01)
*G11B 5/78* (2006.01)

(52) U.S. Cl.
CPC .............. *G11B 23/107* (2013.01); *G11B 5/78* (2013.01)

(58) Field of Classification Search
None
See application file for complete search history.

(56) References Cited

U.S. PATENT DOCUMENTS

| | | | |
|---|---|---|---|
| 6,188,543 B1 | 2/2001 | Terunuma et al. | |
| 6,602,620 B1* | 8/2003 | Kikitsu | G11B 5/7368 |
| 8,937,786 B1 | 1/2015 | Herget | |
| 10,720,181 B1 | 7/2020 | Yamaga et al. | |
| 2006/0067000 A1* | 3/2006 | Doushita | G11B 5/70 360/134 |
| 2006/0092547 A1 | 5/2006 | Kawakami et al. | |
| 2008/0265078 A1* | 10/2008 | Shiga | G11B 23/107 242/324 |
| 2010/0081011 A1* | 4/2010 | Nakamura | G11B 5/73913 428/832 |
| 2019/0378540 A1 | 12/2019 | Sekiguchi et al. | |
| 2020/0035265 A1 | 1/2020 | Kasada | |
| 2020/0118589 A1 | 4/2020 | Terakawa et al. | |
| 2021/0125633 A1 | 4/2021 | Jurneke | |

(Continued)

FOREIGN PATENT DOCUMENTS

JP 6590102 B1 10/2019

OTHER PUBLICATIONS

Office Action dated Dec. 28, 2022 in U.S. Appl. No. 17/730,311.
Office Action dated Feb. 24, 2023 in U.S. Appl. No. 17/847,800.
Office Action dated Mar. 28, 2023 in U.S. Appl. No. 17/730,311.

*Primary Examiner* — William J Klimowicz
(74) *Attorney, Agent, or Firm* — Sughrue Mion, PLLC

(57) ABSTRACT

The magnetic tape container includes a core around which a magnetic tape is wound. The magnetic tape includes a non-magnetic support, and a magnetic layer including a ferromagnetic powder, and the roundness of the trajectory of one rotation drawn by the magnetic tape in a case where the wound magnetic tape is pulled out from the core is 100 μm or less as the arithmetic mean of the measured values at three points in the width direction of the magnetic tape.

20 Claims, 7 Drawing Sheets

(56) References Cited

U.S. PATENT DOCUMENTS

| | | |
|---|---|---|
| 2021/0201945 A1 | 7/2021 | Kasada et al. |
| 2021/0241786 A1* | 8/2021 | Kasada .............. G11B 5/70678 |
| 2021/0375315 A1 | 12/2021 | Kasada |
| 2021/0375318 A1 | 12/2021 | Kasada |
| 2021/0383830 A1 | 12/2021 | Kasada |
| 2022/0199116 A1 | 6/2022 | Kasada |
| 2022/0358958 A1 | 11/2022 | Kasada et al. |
| 2022/0358961 A1 | 11/2022 | Kasada et al. |

* cited by examiner

MAGNETIC TAPE CONTAINER

CROSS-REFERENCE TO RELATED APPLICATIONS

This application claims priority under 35 U.S.C. 119 to Japanese Patent Application No. 2021-030915 filed on Feb. 26, 2021. The above application is hereby expressly incorporated by reference, in its entirety, into the present application.

BACKGROUND OF THE INVENTION

1. Field of the Invention

The present invention relates to a magnetic tape container.

2. Description of the Related Art

Magnetic recording media are divided into tape-shaped magnetic recording media and disk-shaped magnetic recording media, and tape-shaped magnetic recording media, that is, magnetic tapes are mainly used for data storage (for example, see JP6590102B).

SUMMARY OF THE INVENTION

Recording of data on a magnetic tape and reproducing of the recorded data are usually performed while causing the magnetic tape to run in a magnetic recording and reproducing device (generally referred to as a drive) by repeating drawing the magnetic tape wound around one reel and winding around the other reel between two reels. Data is recorded and the recorded data is reproduced by a magnetic head in the drive with respect to the magnetic tape running as described above.

It is generally said that the magnetic tape is excellent in terms of cost performance compared to other recording media, because of its low price per data capacity to be recorded and low power consumption during data storage. The greater the data capacity to be recorded, the greater the cost advantage. Therefore, in recent years, the magnetic tape has been attracting attention as a large-capacity data storage medium. In a case where a data transfer rate (writing speed and/or reading speed) is constant, the greater the data capacity to be recorded, the longer the time required to record the data and reproduce the recorded data. Thus, in order to further increase the capacity of the data to be recorded on the magnetic tape, it is desirable to increase the data transfer rate (writing speed and/or reading speed) of the magnetic tape.

An object of an aspect of the invention is to make it possible to improve a transfer rate during recording of data on a magnetic tape and/or reproducing of the data recorded on magnetic tape.

According to an aspect of the invention, there is provided a magnetic tape container comprising:

a core around which a magnetic tape is wound,
in which the magnetic tape includes a non-magnetic support, and a magnetic layer including a ferromagnetic powder, and
a roundness of a trajectory of one rotation drawn by the magnetic tape in a case where the wound magnetic tape is drawn out from the core (hereinafter, also simply referred to as a "roundness") is 100 µm or less as an arithmetic mean of measured values at three points of the magnetic tape in a width direction.

In one embodiment, the magnetic tape may have a servo pattern on the magnetic layer.

In one embodiment, an entire length of the magnetic tape may be 200 m or more.

In one embodiment, the roundness may be 50 µm or less.

In one embodiment, a maximum value of a deviation of a center position of an average minimum region reference circle of the trajectory of one rotation drawn by the magnetic tape in a case where the wound magnetic tape is drawn out from the core may be 100 µm or less for the three points.

In one embodiment, the maximum value of the deviation of the center position of the average minimum region reference circle may be 80 µm or less for the three points.

In one embodiment, the magnetic tape may further include a non-magnetic layer including a non-magnetic powder between the non-magnetic support and the magnetic layer.

In one embodiment, the magnetic tape may include a back coating layer further containing a non-magnetic powder on a surface side of the non-magnetic support opposite to a surface side provided with the magnetic layer.

In one embodiment, the magnetic tape container may be a magnetic tape cartridge.

In one embodiment, the magnetic tape container may be a magnetic recording and reproducing device and may further include a magnetic head.

In one embodiment, the magnetic head may include a reproducing element having a reproducing element width of 0.8 µm or less.

In one embodiment, the magnetic recording and reproducing device may further include a tension adjusting mechanism which adjusts a tension applied in a longitudinal direction of the magnetic tape which runs in the magnetic recording and reproducing device.

In one embodiment, a vertical squareness ratio of the magnetic tape may be 0.60 or more.

According to the one aspect of the invention, it is possible to improve the transfer rate during recording of data on a magnetic tape and/or reproducing of the data recorded on magnetic tape.

DESCRIPTION OF THE PREFERRED EMBODIMENTS

Figure 1:
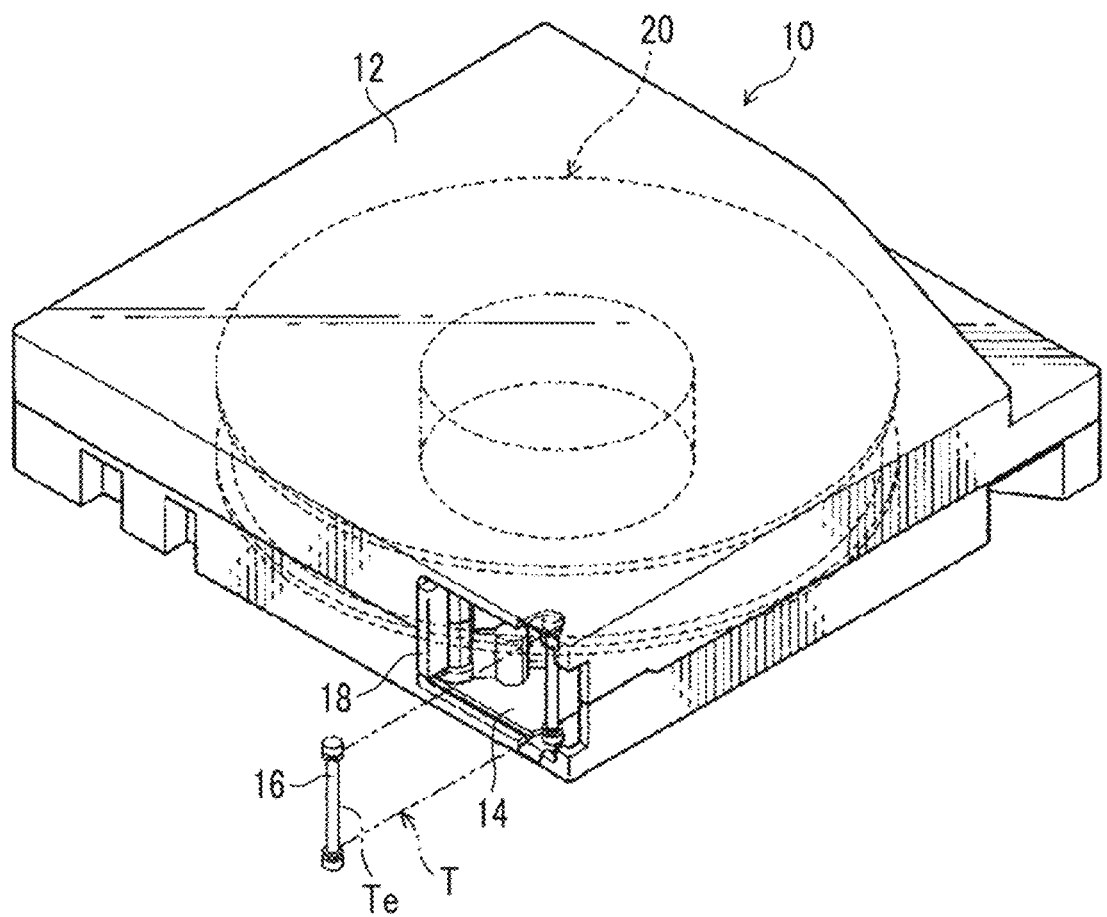
FIG. 1 is a perspective view of an example of a magnetic tape cartridge.

One aspect of the invention relates to a magnetic tape container including a core around which a magnetic tape is wound. The magnetic tape includes a non-magnetic support, and a magnetic layer including a ferromagnetic powder. A roundness of a trajectory of one rotation drawn by the magnetic tape in a case where the wound magnetic tape is drawn out from the core is 100 µm or less as an arithmetic mean of measured values at three points of the magnetic tape in a width direction.

In a magnetic recording and reproducing device which uses a magnetic tape as a magnetic recording medium, a magnetic head is usually embedded in the magnetic recording and reproducing device, whereas the magnetic tape is treated as a removable medium (so-called replaceable medium). For example, a magnetic tape cartridge containing the magnetic tape is inserted into the magnetic recording device, and the magnetic tape is caused to run between a reel of the magnetic tape cartridge and a winding reel embedded in the magnetic recording and reproducing device to record data on the magnetic tape and/or reproduce the data recorded on the magnetic tape. After that, the magnetic tape is accommodated in the magnetic tape cartridge and the magnetic tape cartridge is extracted from the magnetic recording and reproducing device. In such an aspect, the magnetic tape cartridge can be the magnetic tape container, and the core can be a reel provided in the magnetic tape cartridge.

In another aspect, the magnetic tape is not treated as the replaceable medium, and the magnetic tape is accommodated in a magnetic recording and reproducing device including a magnetic head. In such an aspect, the magnetic recording and reproducing device can be the magnetic tape container, and the core can be a reel provided in the magnetic recording and reproducing device.

The configuration of the magnetic tape cartridge and the magnetic recording and reproducing device will be further described later.

As described above, recording of data on a magnetic tape and reproducing of the recorded data are usually performed while causing the magnetic tape to run in a magnetic recording and reproducing device by repeating drawing the magnetic tape wound around one reel and winding around the other reel between two reels. Specifically, the recording of data on a magnetic tape is normally performed by causing the magnetic tape to run in the magnetic recording and reproducing device and causing a magnetic head to follow a data band of the magnetic tape to record data on the data band. Accordingly, a data track is formed on the data band. In addition, in a case of reproducing the recorded data, the magnetic recording and reproducing device is caused to run in the magnetic tape and the magnetic head is caused to follow the data band of the magnetic tape, thereby reading data recorded on the data band. In order to increase an accuracy with which the magnetic head follows the data band of the magnetic tape in the recording and/or the reproducing, a system that performs head tracking using a servo signal (hereinafter, referred to as a "servo system") is practiced. In addition, the dimension information of the magnetic tape in the width direction during the running can be obtained using a servo signal, and the dimension of the magnetic tape in the width direction can be controlled by adjusting the tension applied in the longitudinal direction of the magnetic tape according to the obtained dimension information (as an example, see paragraph 0171 and the like of JP6590102B). It is considered that the tension adjustment can contribute to suppressing the magnetic head for recording and reproducing the data from being deviated from a track position of a target track due to a width deformation of the magnetic tape during the recording and reproducing to cause occurrence of phenomena such as overwriting of the recorded data, reproducing failure, and the like.

In regard to the position deviation of the magnetic tape in the width direction, the present inventors conducted studies to improve the transfer rate of the magnetic tape during the recording of the data on the magnetic tape and/or the reproducing of the data recorded on the magnetic tape (hereinafter, simply referred to as a "transfer rate"), and surmised that the occurrence of position deviation of the magnetic tape in the width direction in a period shorter than a period in which the tension adjustment is performed, in a case of drawing out the wound magnetic tape, can be a reason of a decrease of the transfer rate. Specifically, the present invention surmised that, regardless of whether or not the above tension adjustment is performed, the position deviation of the magnetic tape in the width direction in such a short period can be a reason for increasing a frequency of performing "start/stop" or "repositioning" in which the magnetic recording and reproducing device temporarily stops the running of the magnetic tape and the magnetic tape is reversed to write or read out data again. The more frequently "start/stop" and/or "repositioning" is performed, the longer it takes to write and/or read out the data, resulting in a decrease of the transfer rate. As a result of further intensive studies, the present inventors newly found that, as an indicator related to the position deviation in the width direction in the short period, the roundness of the trajectory during drawing out the magnetic tape which will be described in detail later is used, and by setting this roundness to be 100 µm or less, it is possible to improve the transfer rate during the recording of the data on the magnetic tape and/or reproducing of the recorded data. However, the invention is not limited to other surmises described in this specification including the above surmise.

Hereinafter, the magnetic tape container will be described more specifically.

Aspect of Magnetic Tape Container (Magnetic Tape Cartridge)

An aspect of the magnetic tape container is a magnetic tape cartridge.

The magnetic tape cartridge (hereinafter, also simply referred to as "cartridge") is accommodated in a cartridge main body in a state where the magnetic tape is wound around a reel (core). The core around which the magnetic tape is wound in the magnetic tape container such as the reel of the cartridge is composed of at least a hub, and usually, flanges are provided at both end portions of the hub. The core of the magnetic tape container is rotatably provided inside the magnetic tape container. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data on the magnetic tape, the magnetic tape is drawn from the magnetic tape cartridge and wound around the reel (hereinafter, also referred to as a "winding reel") provided in the magnetic recording and reproducing device. A magnetic head is disposed on a magnetic tape transportation path from the magnetic tape cartridge to a winding reel. Drawing out and winding of the magnetic tape are performed between a reel (supply reel) of the magnetic tape cartridge and a reel (winding reel) of the magnetic recording and reproducing device. In the meantime, for example, the magnetic head comes into contact with and slides on the surface of the magnetic layer of the magnetic tape, and accordingly, the recording and/or reproducing of data is performed. With respect to this, in the twin reel type magnetic tape cartridge, both reels of the supply reel and the winding reel are provided in the magnetic tape cartridge. The magnetic tape container can be a single reel type magnetic tape cartridge in one embodiment, and can be a twin reel type magnetic tape cartridge in another embodiment. In a case where the magnetic tape container is a twin reel type magnetic tape cartridge, the core from which the magnetic tape is drawn out for the measurement of the roundness, which will be described in detail later, is a reel around which more parts of the magnetic tape are wound, in a state where the magnetic tape cartridge is not used, among the two reels. Regarding the single reel type and twin reel type magnetic tape cartridges, the roundness measurement which will be described in detail later is performed using an unused magnetic tape cartridge. In the present invention and the present specification, the term "unused" with respect to the magnetic tape container (for example, the magnetic tape cartridge or the magnetic recording and reproducing device) means that the running of the magnetic tape accommodated in the magnetic tape container is not performed after being provided as a product. In one embodiment, the magnetic tape container is preferably a single reel type magnetic tape cartridge that has been mainly adopted in recent years in the field of data storage.

The hub of the core is a cylindrical member that configures an axial center portion around which the magnetic tape is wound. The hub of the core can be a single-layer cylindrical member or can be a multi-layered cylindrical member having two or more layers. From viewpoints of manufacturing cost and ease of manufacturing, the hub of the core is preferably a single-layer cylindrical member.

The inventors considers that high stiffness of the hub of the core around which the magnetic tape is wound can contribute to the suppressing of the occurrence of position deviation in the width direction in the short period described above in a case of drawing out the wound magnetic tape. From this viewpoint, in one aspect, a modulus of bending elasticity of a material constituting at least an outer peripheral side surface layer portion of the hub is preferably 5 GPa (gigapascal) or more, more preferably 6 GPa or more, even more preferably 7 GPa or more, and still preferably 8 GPa or more. The modulus of bending elasticity can be, for example, 20 GPa or less, 15 GPa or less, or 10 GPa or less. However, it is considered that a high modulus of bending elasticity is preferable in order to suppress the occurrence of position deviation in the width direction in the short period. Therefore, the modulus of bending elasticity may exceed the value exemplified here.

In a case where the hub of the core is the single-layer cylindrical member, the modulus of bending elasticity is a bend elastic modulus of the material constituting the cylindrical member. On the other hand, in a case where the hub is a multi-layered cylindrical member having two or more layers, the modulus of bending elasticity is a bend elastic modulus of the material constituting at least the outer peripheral side surface layer portion of the hub. In the present invention and the present specification, the "modulus of bending elasticity" is a value obtained according to JIS (Japanese Industrial Standards) K 7171: 2016. JIS K 7171: 2016 is the Japanese Industrial Standard created based on ISO (International Organization for Standardization) 178 and Amendment 1: 2013, which was published as the 5th edition in 2010, without changing the technical contents. A test piece used for measuring the modulus of bending elasticity is prepared according to section 6 "Test piece" of JIS K 7171: 2016.

Examples of the material constituting the hub of the core such as the reel of the magnetic tape cartridge include a resin and a metal. Examples of the metal include aluminum. The resin is preferable from viewpoints of cost, productivity, and the like. Examples of the resin include fiber reinforced resins. Examples of the fiber reinforced resin include a glass fiber reinforced resin and a carbon fiber reinforced resin. As such a fiber reinforced resin, a fiber reinforced polycarbonate is preferable. This is because polycarbonate is easy to procure and can be molded with a high accuracy and at low cost by a general-purpose molding machine such as an injection molding machine. In addition, in the glass fiber reinforced resin, a content of the glass fiber is preferably 15% by mass or more. The higher the content of glass fiber, the higher the modulus of bending elasticity of the glass fiber reinforced resin tends to be. As an example, the content of the glass fiber of the glass fiber reinforced resin can be 50% by mass or less or 40% by mass or less. In one embodiment, the resin constituting the hub is preferably glass fiber reinforced polycarbonate. In addition, as the resin constituting the hub, a high-strength resin generally called a super engineering plastic or the like can be used. An example of a super engineering plastic is polyphenylene sulfide (PPS).

A thickness of the hub is preferably in a range of 2.0 to 3.0 mm, from viewpoints of satisfying both a strength of the hub and a dimensional accuracy during molding. The thickness of the hub means a total thickness of such multiple layers for a hub having a multi-layer structure of two or more layers. An outer diameter of the hub is usually determined by the standard of the magnetic recording and reproducing device, and can be in a range of, for example, 20 to 60 mm.

Hereinafter, the configuration of the magnetic tape cartridge will be described with reference to the drawings. However, the aspect shown in the drawings is an example, and the present invention is not limited to such an example.

FIG. 1 is a perspective view of an example of a magnetic tape cartridge. FIG. 1 shows a single reel type magnetic tape cartridge.

A magnetic tape cartridge 10 shown in FIG. 1 includes a case 12. The case 12 is formed in a rectangular box shape. The case 12 is generally made of a resin such as polycarbonate. Inside the case 12, only one reel 20 is rotatably accommodated.

Figure 2:
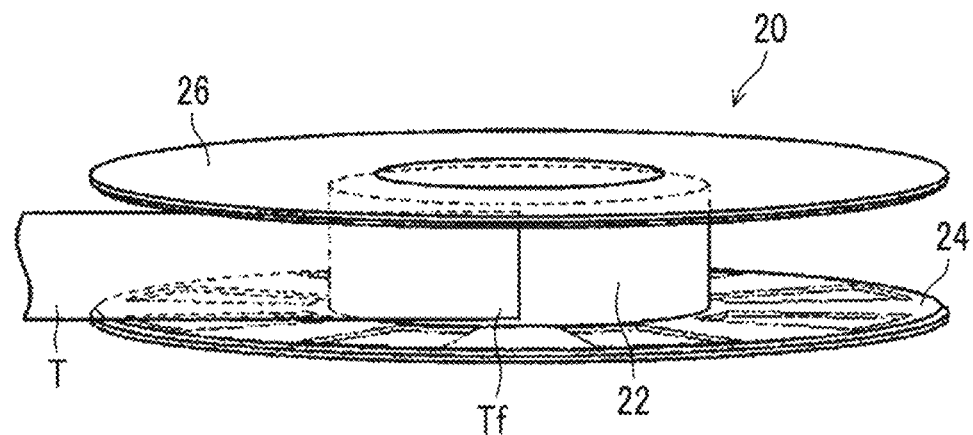
FIG. 2 is a perspective view in a case where a magnetic tape is started to be wound around a reel.
Figure 3:
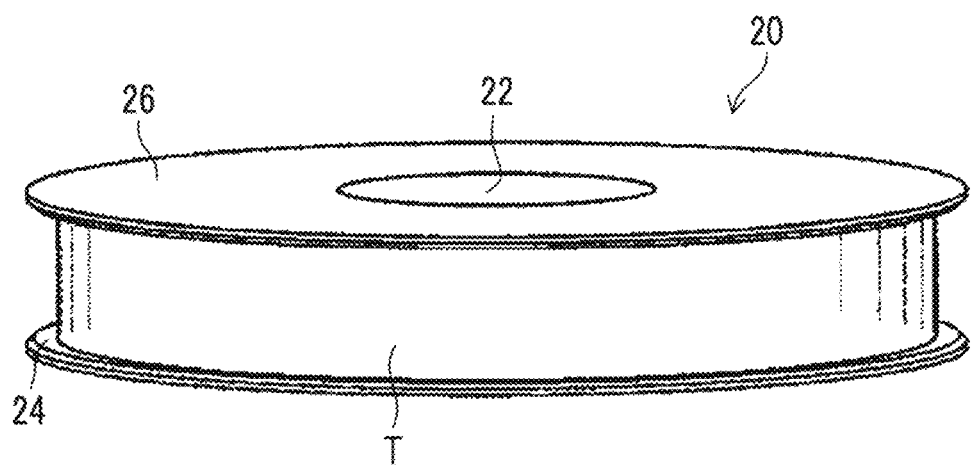
FIG. 3 is a perspective view in a case where the magnetic tape has been wound around the reel.

FIG. 2 is a perspective view in a case where a magnetic tape is started to be wound around a reel. FIG. 3 is a perspective view in a case where the magnetic tape has been wound around the reel.

The reel 20 includes a cylindrical reel hub 22 that constitutes an axial center portion. The reel hub is as described above in detail.

Flanges (lower flange 24 and upper flange 26) protruding outward in a radial direction from an upper end portion and a lower end portion of the reel hub 22, respectively are provided on both end portions of the reel hub 22. Here, regarding "upper" and "lower", in a case where the magnetic tape cartridge is mounted on the magnetic recording and reproducing device, a side located above is referred to as "upper" and a side located below is referred to as "lower". One or both of the lower flange 24 and the upper flange 26 is preferably configured integrally with the reel hub 22, from a viewpoint of reinforcing the upper end portion side and/or the lower end portion side of the reel hub 22. The term "integrally configured" means that it is configured as one member, not as a separate member. In a first embodiment, the reel hub 22 and the upper flange 26 are configured as one member, and this member is joined to the lower flange 24 configured as a separate member by a well-known method. In a second embodiment, the reel hub 22 and the lower flange 24 are configured as one member, and this member is joined to the upper flange 26 configured as a separate member by a well-known method. The reel of the magnetic tape cartridge may be in any form. Each member can be manufactured by a well-known molding method such as injection molding.

A magnetic tape T is wound around an outer circumference of the reel hub 22 starting from a tape inner terminal Tf (see FIG. 2). A tension applied in the longitudinal direction of the magnetic tape in a case of winding the magnetic tape around the reel hub is preferably 1.5 N (Newton) or less, more preferably 1.0 N or less, and also preferably tension-free.

A side wall of the case 12 has an opening 14 for drawing out the magnetic tape T wound around the reel 20, and a leader pin 16 that is drawn out while being locked by a drawing member (not shown) of the magnetic recording and reproducing device (not shown) is fixed to a tape outer terminal Te drawn out from this opening 14.

In addition, the opening 14 is opened and closed by a door 18. The door 18 is formed in a shape of a rectangular plate having a size capable of closing the opening 14, and is biased by a bias member (not shown) in a direction of closing the opening 14. In a case where the magnetic tape cartridge 10 is mounted on the magnetic recording and reproducing device, the door 18 is opened against a bias force of the bias member.

A well-known technology relating to the magnetic tape cartridge can be applied for other details of the magnetic tape cartridge.

In the above aspect, the magnetic tape is treated as a removable medium (so-called replaceable medium), and a magnetic tape cartridge (magnetic tape container) accommodating the magnetic tape can be inserted into the magnetic recording and reproducing device, and the magnetic tape cartridge accommodating the magnetic tape can also be extracted from the magnetic recording and reproducing device.

Figure 4:
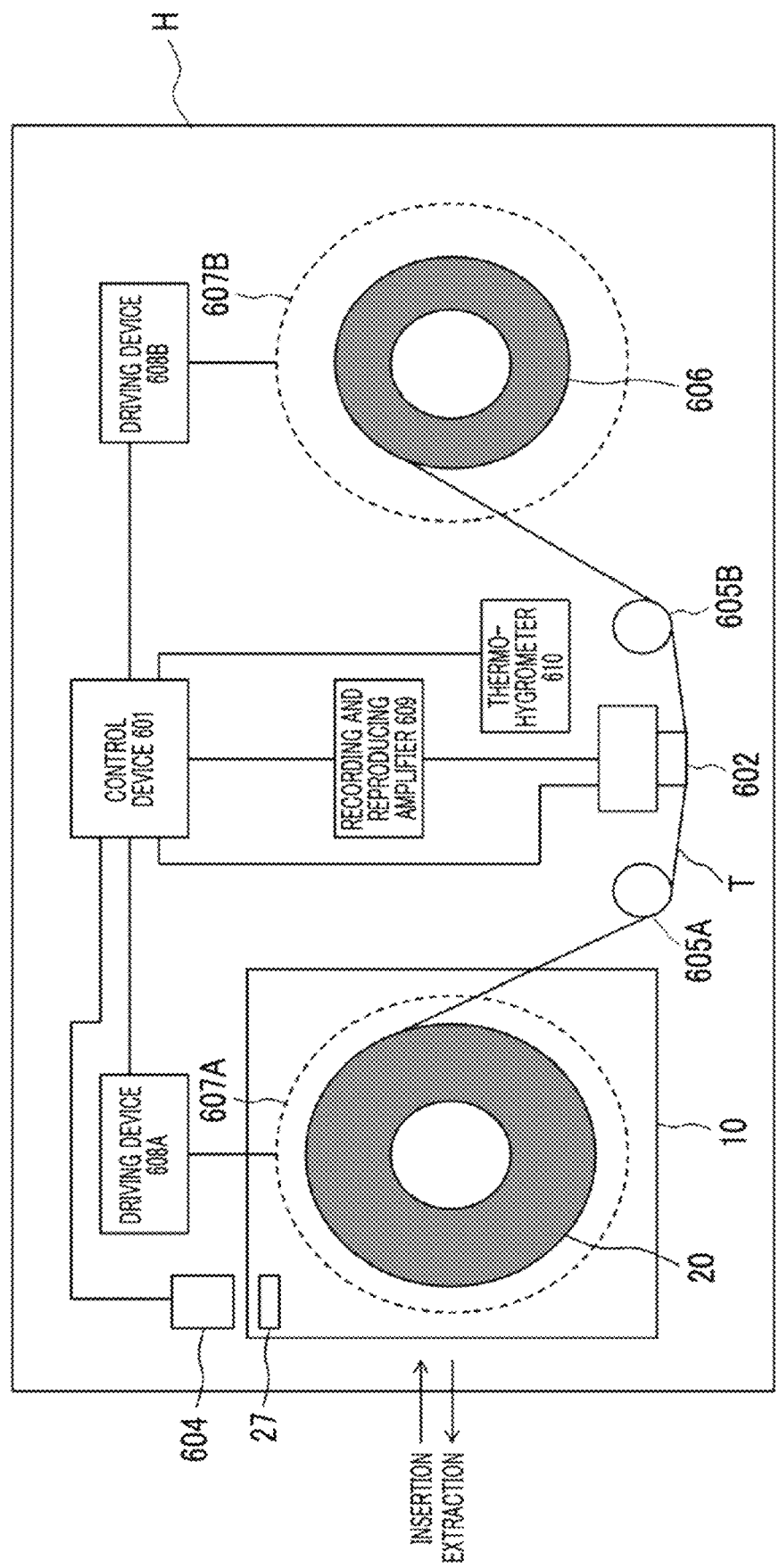
FIG. 4 shows a schematic view of an example of a magnetic recording and reproducing device in a state in which a magnetic tape cartridge is inserted.

FIG. 4 shows a schematic view of an example of a magnetic recording and reproducing device in a state in which a magnetic tape cartridge is inserted. In FIG. 4, the magnetic tape cartridge 10 is inserted into a housing H of a magnetic recording and reproducing device 60, the magnetic tape T is drawn out into the housing H and is wound around a winding reel 606. The housing H can be formed of metal, a resin, or the like.

Regarding the magnetic tape cartridge 10, the above description regarding the single reel type magnetic tape cartridge can be referred to.

The recording and reproducing of data on the magnetic tape T are performed by controlling a recording and reproducing head unit 602 in accordance with a command from a control device 601.

The magnetic recording and reproducing device 60 has a configuration of detecting and adjusting a tension applied in a longitudinal direction of the magnetic tape from spindle motors 607A and 607B and driving devices 608A and 608B which rotatably control a cartridge reel 20 and a winding reel 606.

The magnetic recording and reproducing device 60 has a configuration in which the magnetic tape cartridge 10 can be mounted.

The magnetic recording and reproducing device 60 includes a cartridge memory read and write device 604 capable of performing reading and writing with respect to the cartridge memory 27 in the magnetic tape cartridge 10. The cartridge memory can be, for example, a non-volatile memory, and, in one aspect, the information related to the tension adjustment which will be described later is recorded in advance or the information related to the tension adjustment is recorded. The information related to the tension adjustment is information for adjusting the tension applied in the longitudinal direction of the magnetic tape.

A terminal or a leader pin of the magnetic tape T is drawn out from the magnetic tape cartridge 10 inserted into the housing H of the magnetic recording and reproducing device 60 by an automatic loading mechanism or manually and passes on a recording and reproducing head through guide rollers 605A and 605B so that a surface of a magnetic layer of the magnetic tape T comes into contact with a surface of the recording and reproducing head of the recording and reproducing head unit 602, and accordingly, the magnetic tape T is wound around the winding reel 606. In one embodiment, the magnetic head comes into contact with and slides on the surface of the magnetic layer of the magnetic tape, in a case of recording data on the magnetic tape and/or reproducing the data recorded on the magnetic tape in the magnetic recording and reproducing device. Such a magnetic recording and reproducing device is generally called a sliding type drive or a contact sliding type drive. In another aspect, in the magnetic recording and reproducing device, the magnetic head performs the recording of the data on the magnetic tape and/or the reproducing of the data recorded on the magnetic tape in a contactless state with the surface of the magnetic layer, except for a case of random contact. The magnetic recording and reproducing device of the aspect is generally called a floating type drive.

The rotation and torque of the spindle motor 607A and the spindle motor 607B are controlled by a signal from the control device 601, and the magnetic tape T runs at random speed and tension. A servo pattern previously formed on the magnetic tape can be used to control the tape speed. A tension detection mechanism may be provided between the magnetic tape cartridge 10 and the winding reel 606 to detect the tension. The tension may be adjusted by using the guide rollers 605A and 605B in addition to the control by the spindle motors 607A and 607B.

The cartridge memory read and write device 604 is configured to be able to read and write information of the cartridge memory 27 according to commands from the control device 601. As a communication system between the cartridge memory read and write device 604 and the cartridge memory 27, for example, an international organization for standardization (ISO) 14443 system can be used.

The control device 601 includes, for example, a controller, a storage unit, a communication unit, and the like.

The recording and reproducing head unit 602 is composed of, for example, a recording and reproducing head, a servo tracking actuator for adjusting a position of the recording and reproducing head in a track width direction, a recording and reproducing amplifier 609, a connector cable for connecting to the control device 601. The recording and reproducing head is composed of, for example, a recording element for recording data on a magnetic tape, a reproducing element for reproducing data of the magnetic tape, and a servo signal reading element for reading a servo signal recorded on the magnetic tape. For example, one or more of each of the recording elements, the reproducing element, and the servo signal reading element are mounted in one magnetic head. Alternatively, each element may be separately provided in a plurality of magnetic heads according to a running direction of the magnetic tape.

The recording and reproducing head unit 602 is configured to be able to record data on the magnetic tape T according to a command from the control device 601. In addition, the data recorded on the magnetic tape T can be reproduced according to a command from the control device 601.

The control device 601 has a mechanism of controlling the servo tracking actuator so as to obtain a running position of the magnetic tape from a servo signal read from a servo band during the running of the magnetic tape T and position the recording element and/or the reproducing element at a target running position (track position). The control of the track position is performed by feedback control, for example. The control device 601 has a mechanism of obtaining a servo band interval from servo signals read from two adjacent servo bands during the running of the magnetic tape T. The control device has a mechanism of adjusting and changing the tension applied in the longitudinal direction of the magnetic tape by controlling the torque of the spindle motor 607A and the spindle motor 607B and/or the guide rollers 605A and 605B so that the servo band interval becomes a target value. The adjustment of the tension is performed by feedback control, for example. In addition, the control device 601 can store the obtained information of the servo band interval in the storage unit inside the control device 601 disposed in the housing H of the magnetic recording and reproducing device 60, a storage device (not shown) disposed in the housing H as a device different from the control device, a cartridge memory 27, an external storage device (not shown) disposed outside of the housing H, and the like.

In the magnetic recording and reproducing device 60, the tension can be applied in the longitudinal direction of the magnetic tape during the recording and/or reproducing. The tension applied in the longitudinal direction of the magnetic tape is a constant value in one embodiment and changes in another embodiment. For example, as described above, a tension detection mechanism can be provided for detection between the magnetic tape cartridge 10 and the winding reel 606 in FIG. 4. In addition, for example, the tension can also be controlled by the control device or the like of the magnetic recording and reproducing device so that a minimum tension is not less than a value determined by a standard or a recommended value and/or a maximum tension is not greater than a value determined by a standard or a recommended value. For example, in this way, by the tension adjusting mechanism capable of adjusting the tension applied to the longitudinal direction of the magnetic tape which runs in the magnetic recording and reproducing device, it is possible to variably control the tension applied to the longitudinal direction of the magnetic tape. Preferably, the dimension of the magnetic tape in the width direction can be controlled by adjusting the tension applied in the longitudinal direction of the magnetic tape. In the tension adjustment, the tension applied in the longitudinal direction of the magnetic tape can be changed.

The recording of the data on the magnetic tape is performed while causing the magnetic tape T to run between the winding reel 606 and the cartridge reel 20. The reproducing of the data recorded on the magnetic tape is also performed while causing the magnetic tape T to run between the winding reel 606 and the cartridge reel 20. After the recording and/or reproducing ends, the magnetic tape T is usually wound around the cartridge reel 20 of the magnetic tape cartridge 10, and the entire length of the magnetic tape T is accommodated in the magnetic tape cartridge 10. The magnetic tape cartridge 10 accommodating the magnetic tape T is held in the housing H of the magnetic recording and reproducing device 60 in one aspect, and is extracted from the housing H in the other aspect. A thermo-hygrometer 610 can be arbitrarily disposed in the housing H of the magnetic recording and reproducing device 60. The temperature and humidity inside the housing H of the magnetic recording and reproducing device 60 can be measured and monitored by the thermo-hygrometer 610.

Other aspect of magnetic tape container (magnetic recording and reproducing device)

The other aspect of the magnetic tape container is the magnetic recording and reproducing device. In this aspect, the magnetic tape is not treated as a replaceable medium, and the magnetic tape and the magnetic head are accommodated in the magnetic tape container (magnetic recording and reproducing device). In the present embodiment, the core from which the magnetic tape is drawn out for the measurement of roundness, which will be described in detail later, is a reel around which more parts of the magnetic tape are wound, among the two reels in the unused magnetic recording and reproducing device. In addition, in the present embodiment, the measurement of roundness, which will be described in detail later, is performed using the magnetic recording and reproducing device in an unused state.

Figure 5:
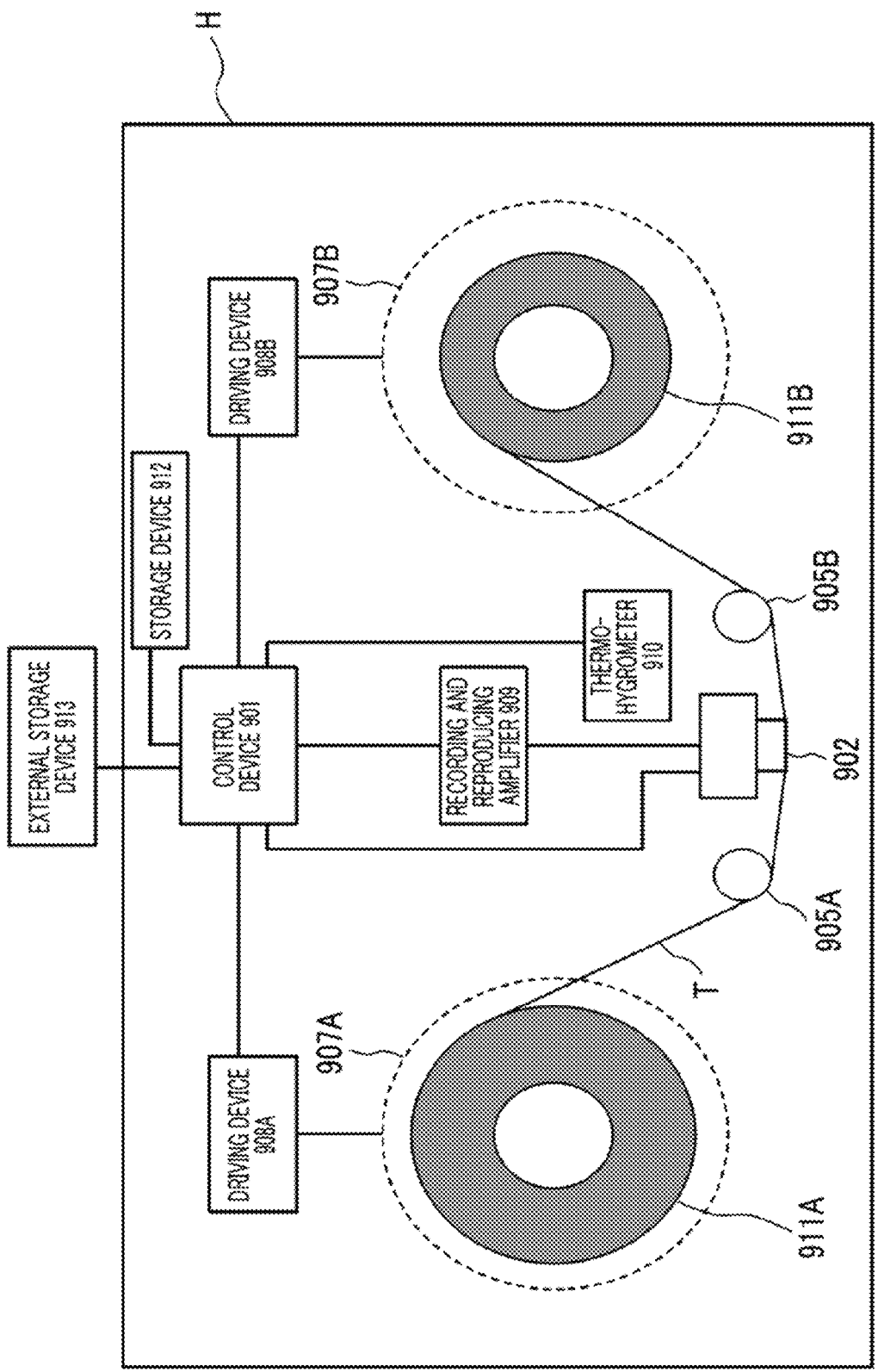
FIG. 5 shows a schematic view of an example of the magnetic recording and reproducing device.

FIG. 5 shows a schematic view of an example in which a reel on which a magnetic tape is wound and a magnetic recording and reproducing device are integrated as an example of the embodiment. In FIG. 5, a tape reel 911A and a tape reel 911B are fixed in the housing H of a magnetic recording and reproducing device 90, and the magnetic tape T is not treated as a replaceable medium. The recording of the data on the magnetic tape is performed while causing the magnetic tape T to run between the tape reels 911A and 911B. The reproducing of the data recorded on the magnetic tape is also performed while causing the magnetic tape T to run between the tape reels 911A and 911B. After the end of recording and/or reproducing, the magnetic tape T is usually stored in the magnetic recording and reproducing device 90 with most of it wound around the tape reel 911A or the tape reel 911B.

For the housing H, a control device 901, a recording and reproducing head unit 902, guide rollers 905A and 905B, spindle motors 907A and 907B, driving devices 908A and 908B, a recording and reproducing amplifier 909, and a thermo-hygrometer 910 in FIG. 5, the above description for each part of FIG. 4 can be referred to. For the tape reels 911A and 911B, the above description for each part of FIGS. 2, 3, and 4, respectively, can be referred to.

The magnetic recording and reproducing device 90 includes a storage device 912 accommodated in the housing H and an external storage device 913 disposed outside the housing H. The control device 901 can store, for example, information on the servo band interval obtained as described above with respect to FIG. 4 in the storage device 912 and/or the external storage device 913.

In any aspect, the entire length of the magnetic tape accommodated in the magnetic tape container is not particularly limited, and can be, for example, 200 m or more, or 800 m or more (for example, in a range of approximately 800 m to 2500 m). The longer the entire length of the tape accommodated in one magnetic tape container is, the more preferable it is from a viewpoint of increasing the capacity of the magnetic tape container.

Magnetic Tape

Roundness

For the magnetic tape accommodated in the magnetic tape container, a roundness of a trajectory of one rotation drawn by the magnetic tape in a case where the magnetic tape wound around the core is drawn out from the core is 100 μm or less as an arithmetic mean of measured values at three points of the magnetic tape in a width direction. The present inventors adopted the roundness as an indicator of the position deviation in the width direction in the short period described above. The inventors consider that the fact that the roundness is 100 μm or less means that the magnetic tape is a magnetic tape in which the position deviation in the width direction in the short period described above is suppressed, and this makes it possible to improve the transfer rate. From a viewpoint of further improving the transfer rate, the roundness is preferably 95 μm or less, more preferably 90 μm or less, even more preferably 85 μm or less, still preferably 80 μm or less, still more preferably 75 μm or less, still even more preferably 70 μm or less. In addition, the roundness can be, for example, 30 μm or more, 35 μm or more, 40 μm or more, or 45 μm or more, and can be lower than the value exemplified here. A smaller roundness value is preferable from a viewpoint of further improving the transfer rate. The roundness control method will be described later.

The "roundness" in the present invention and the present specification is a value obtained by the following method.

The following measurements are performed in a measurement environment where an atmosphere temperature is in a range of 20° C. to 25° C. and a relative humidity is in a range of 40% to 60%. In order to acclimatize the device used for the measurement and the magnetic tape container to be measured to the measurement environment, the measurement is performed after placing them in the measurement environment for at least one day.

Hereinafter, the measurement method will be described by taking the case where the magnetic tape container to be measured is a single reel type magnetic tape cartridge as an example.

In order to draw out the magnetic tape from the reel (core) of the magnetic tape cartridge, a magnetic recording and reproducing device (drive) in which the magnetic tape cartridge can be attached and detached is used. In order to observe a surface of the magnetic tape drawn out from the reel (core) and an upper surface of the upper flange of the reel in the case of the magnetic tape cartridge while being set in the drive, the following processing is performed on the magnetic tape cartridge. After the magnetic tape cartridge to be measured is placed in the measurement environment for one day or longer, the reel around which the magnetic tape is wound is extracted from the case of the magnetic tape cartridge. The reel is extracted in the measurement environment described above. In a case where a leader tape and/or a leader pin is attached to the magnetic tape wound around the reel, the extraction described above is performed in a state where these are attached. The reel extracted as described above (the magnetic tape is wound) is placed in the measurement environment until it is transferred to a case having an opening portion. In a case where the magnetic tape cartridge contains a cartridge memory, the cartridge memory is extracted as well. The extracted reel and cartridge memory are transferred to the case of the cartridge provided with the opening portion, so that the upper surface of the upper flange on the reel and the surface of the magnetic tape can be observed with an optical discrimination sensor and a laser displacement meter, respectively, from the exterior of the case. The transfer to the case provided with the opening portion is carried out in the above measurement environment. Alternatively, the case of the magnetic tape cartridge to be measured may be processed to form the opening portion described above. The processing for forming the opening portion is carried out while the reel around which the magnetic tape is wound is accommodated in the case, or after the reel around which the magnetic tape is wound is once extracted from the case. The reel is extracted in the measurement environment after the magnetic tape cartridge to be measured is placed in the measurement environment for one day or longer. In a case where a leader tape and/or a leader pin is attached to the magnetic tape wound around the reel, the extraction described above is performed in a state where these are attached. The reel extracted as described above (the magnetic tape is wound) is placed in the measurement environment until it is accommodated again in the case after molding the opening portion. In a case where the processing for forming the opening portion is performed while the reel around which the magnetic tape is wound is accommodated in the case, the magnetic tape cartridge to be measured is placed in the above measurement environment for one day or longer, and then the opening portion is formed in the measurement environment. The opening portion can be formed by a well-known method.

A seal or the like that reflects light is attached to the upper surface of the upper flange of the reel, and the rotation period of the reel (core) of the magnetic tape cartridge is detected by detecting this with an optical discrimination sensor or the like during measurement. As the optical discrimination sensor, for example, an optical discrimination sensor capable of emitting light having a spot diameter of about 5 mm and capable of externally outputting an electric signal synchronized with the index can be used. Specific examples include CZ-H35S and CZ-C21A manufactured by KEYENCE.

As a laser displacement meter for measuring the displacement of the surface of the magnetic tape drawn from the reel (core), a laser displacement meter having a laser spot diameter of 1.5 mm or less, a displacement resolution of 0.5 μm or less, and a time resolution of 50μ second or shorter, and capable of externally outputting an electric signal according to the displacement amount is used. Specific examples of the laser displacement meter that can be used include LK-G85 and LK-GD500 manufactured by KEYENCE.

The magnetic tape cartridge is inserted into the magnetic recording and reproducing device and the magnetic tape is loaded. The magnetic recording and reproducing device used for the measurement may be of any standard and generation as long as the magnetic tape cartridge can be mounted and the magnetic tape accommodated in the magnetic tape cartridge can run. In a case where the reel of the magnetic tape cartridge to be measured (the magnetic tape is wound) and the cartridge memory are transferred to another magnetic tape cartridge having an opening portion in the case, the loading of the tape is performed according to information recorded on the transferred cartridge memory.

Figure 6:
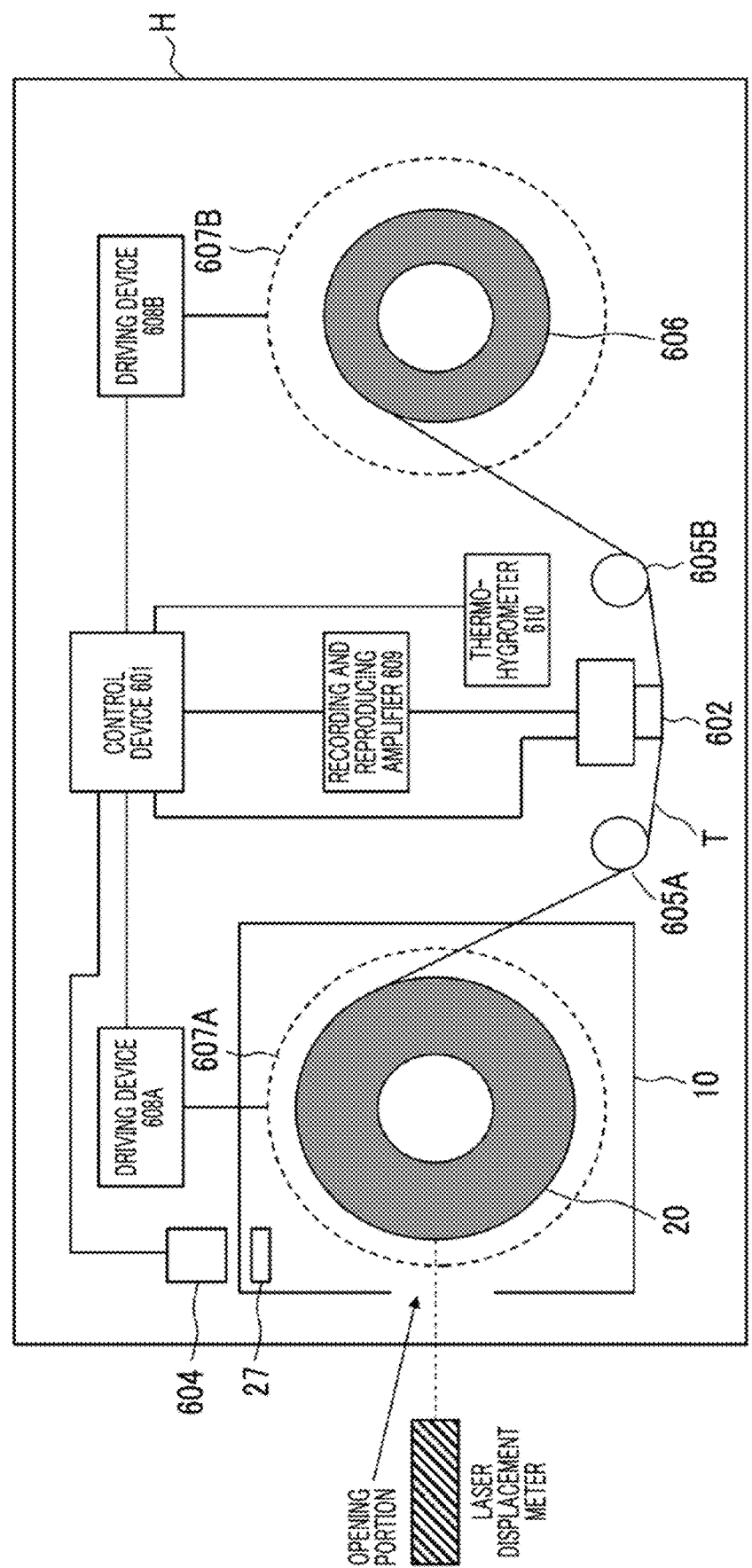
FIG. 6 shows a schematic view of a state in which a magnetic tape cartridge having an opening portion formed in a case is mounted on the magnetic recording and reproducing device shown in FIG. 4.

FIG. 6 shows a schematic view of a state in which a magnetic tape cartridge having an opening portion formed in a case is mounted on the magnetic recording and reproducing device shown in FIG. 4. An upper part of the magnetic recording and reproducing device may be opened or an opening portion may be provided in the housing H of the magnetic recording and reproducing device so that the displacement of the surface of the magnetic tape can be measured by the laser displacement meter. For example, as shown in FIG. 6, the position where the displacement of the surface of the magnetic tape is measured by the laser displacement meter is a rotation angle position where the magnetic tape is not completely unwound from the reel (core) of the magnetic tape cartridge. In FIG. 6, a dotted line extending from the laser displacement meter schematically shows a laser beam. The measurement points on the surface of the magnetic tape in the width direction are three points of a central portion in a tape width direction, a portion at 1 mm below an upper edge, and a portion at 1 mm above the lower edge. A width of the magnetic tape is determined according to the standard, for example ½ inch. ½ inches=12.65 mm. However, even for magnetic tapes having a width other than ½ inch, the measurement points in the width direction are the above three points.

At the time of measurement, a digital oscilloscope, a data logger, or the like is used to continuously measure the electric signal of the displacement of the magnetic tape surface obtained by the laser displacement meter and the electric signal of the reel rotation index obtained by the optical discrimination sensor. The measurement pitch is set as a measurement pitch finer than the reel rotation angle of 1°.

After loading the magnetic tape in the magnetic recording and reproducing device, while winding the magnetic tape around the reel (winding reel 606 in the example shown in FIG. 6) of the magnetic recording and reproducing device at a constant speed in a range of 2 m/sec to 8 m/sec by applying a tension in a range of 0.3 N (Newton) to 1.1 N in the longitudinal direction, the electric signal of the displacement of the surface of the magnetic tape and the electric signal of the rotation index of the reel are measured by using the digital oscilloscope, the data logger, and the like as described above and stored. The above tension value and speed value are set values in the magnetic recording and reproducing device.

The electric signal of the displacement is converted into a displacement amount (unit: μm) using a coefficient for converting the electric signal of the displacement (voltage value) into a displacement amount, which is defined for the laser displacement meter used. Such a coefficient is described in, for example, a spec sheet of the laser displacement meter. Using the electric signal of the rotation index of the reel obtained in the measurement described above, a measurement result used for calculating the roundness is extracted from the measurement results of the displacement amount. Specifically, in a state of being wound around the reel (core) of the magnetic tape cartridge, a terminal of the magnetic tape on the reel side is referred to as an inner terminal, another terminal thereof is referred to as an outer terminal, and one rotation of the core is defined as one period. The measurement result of three continuous rotations (three periods) after a length of approximately 50 m from the outer terminal of the magnetic tape is wound around the reel of the magnetic recording and reproducing device is extracted.

Using the extracted measurement result (displacement amount), the roundness of the trajectory of the magnetic tape drawn from the core is calculated for each rotation (1 period), and for the three measurement points in the width direction, the roundness of the trajectory of one rotation is obtained as an arithmetic mean of the three rotations (three periods). The arithmetic mean of the values obtained for each of the three points is used as a value of the roundness of the trajectory of one rotation of the magnetic tape in the magnetic tape cartridge (magnetic tape container) to be measured. The roundness is calculated by a method defined in JISB0621: 1984 (minimum region center method). The roundness refers to a magnitude of deviation from a geometrically correct circle (called a geometric circle) having a circular shape, as defined in section 4.3 of JISB0621: 1984. As defined in the section 5.3 of the same JIS, in a case of being interposed between two concentric geometric circles having a circular shape, the roundness is represented by a difference of radii of two circles, in a case where a gap between the two concentric circles is a minimum. In a case where the trajectory of one rotation of the magnetic tape drawn from the core is a geometric circle, a distance between the laser displacement meter measured by the laser displacement meter and the measurement position on the surface of the magnetic tape is constantly the same value during one rotation (hereinafter, referred to as X). However, in a case where the trajectory deviates from the geometric circle, the distance between the laser displacement meter measured by the laser displacement meter and the measurement position on the surface of the magnetic tape becomes shorter or longer than X. The difference between this distance and X is the displacement amount measured by the laser displacement meter, and from this displacement amount, the trajectory of one rotation of the magnetic tape drawn from the core can be drawn. For the trajectory drawn in this way, the roundness is calculated as described above.

In a case where the magnetic tape container is a magnetic recording and reproducing device, the upper part of the magnetic recording and reproducing device is opened or the opening portion of the case of the magnetic recording and reproducing device is provided so that the upper surface of the flange of the reel and the surface of the magnetic tape are respectively observed by the optical discrimination sensor and the laser displacement meter from the outside of the device. By using the unused magnetic recording and reproducing device, except for that the magnetic tape is wound around the other reel from the other reel (winding core) by running the magnetic tape in this magnetic recording and reproducing device, the roundness is obtained by the method described above using the case where the magnetic tape container is a single reel type magnetic tape cartridge as an example.

In a case where the magnetic tape container is a twin reel type magnetic tape cartridge, the opening portion is provided in the magnetic tape cartridge so that the upper surface of the flange of the reel and the surface of the magnetic tape can be respectively observed by the optical discrimination sensor and the laser displacement meter from the outside of the case. Except for that the unused twin reel type magnetic tape cartridge is mounted on the magnetic recording and reproducing device and the magnetic tape is wound around the other reel from the other reel (core) of the magnetic tape cartridge, the roundness is obtained by the method described above using the case where the magnetic tape container is a single reel type magnetic tape cartridge as an example.

From a viewpoint of further improving the transfer rate, the present inventors consider that the fact that the maximum value of the deviation of the center position of the average minimum region reference circle of the trajectory of one rotation drawn by the magnetic tape, in a case of drawing the magnetic tape wound around the core out from the core, is 100 μm or less means that the position deviation in the width direction in the short period described above is further suppressed. From a viewpoint of further improving the transfer rate, the maximum value of the deviation of the center position of the average minimum region reference circle for the above three points of the magnetic tape in the width direction is preferably 100 μm or less for the above three points, more preferably 95 μm or less, even more preferably 90 μm or less, still preferably 85 μm or less, still more preferably 80 μm or less, still even more preferably 75 μm or less, still further preferably 70 μm or less, still further more preferably 65 μm or less, still even further more preferably 60 μm or less, still much more preferably 55 μm or less, and particularly preferably 50 μm or less. In addition, the maximum value of the deviation of the center position of the average minimum region reference circle can be, for example, 30 μm or more, 35 μm or more, 40 μm or more, or 45 μm or more. It is preferable that this value is smaller, from a viewpoint of further improving the transfer rate.

The maximum value of the deviation of the center position of the average minimum region reference circle described above (hereinafter, also referred to as "reference circle center position deviation") is obtained by the following method.

From the measurement result of the displacement amount obtained to obtain the roundness, the calculation of the average minimum region reference circle for one rotation (one period) for each of the three points of the magnetic tape in the width direction is performed for three rotations (three periods). The average minimum region reference circle is a circle having a radius of an arithmetic mean of the minimum region reference circle defined in JISB JISB0682-1: 2017 3.3.1.1.3, and is hereinafter, simply referred to as a reference circle. For each of the above three points, the arithmetic mean of the position coordinates of the center position of the reference circle for three rotations is defined as a position coordinate of the center position of the reference circle at each point. From the position coordinates of the center position of the reference circle obtained for each of the above three points, the maximum value of the deviation of the center position of the average minimum region reference circle of the above three points (reference circle center position deviation) is obtained. That is, the reference circle center position deviation is obtained as a distance between two points farthest from the center positions of the three reference circles. The method for controlling the reference circle center position deviation will be described later.

Hereinafter, a magnetic tape included in the magnetic tape container will be described more specifically.

Existence State of Recesses on Surface of Magnetic Layer

The magnetic tape includes a non-magnetic support, and a magnetic layer including a ferromagnetic powder. From the viewpoint of controlling the roundness described above and further controlling the deviation of the center position of the reference circle, the number of recesses having an equivalent circle diameter of 0.20 μm to 0.50 μm existing on the surface of the magnetic layer is determined. It is preferable that the number is 10 to 500 per 40 μm×40 μm area.

In the invention and the specification, the number of recesses having an equivalent circle diameter of 0.20 μm to 0.50 μm existing on the surface of the magnetic layer is obtained by performing measurement on the surface of the magnetic layer of the magnetic tape by using an atomic force microscope (AFM) as will be described below. In the invention and the specification, the "surface of the magnetic layer" is identical to the surface of the magnetic tape on the magnetic layer side. The number of recesses having an equivalent circle diameter of 0.20 μm to 0.50 μm existing on the surface of the magnetic layer (per 40 μm×40 μm area), which is obtained as will be described below, is also defined as the "number of recesses having an equivalent circle diameter in the above range" or simply the "number of recesses".

A measurement area is a 40 μm square (40 μm×40 μm) region that is randomly selected from the surface of the magnetic layer. The measurement is performed at three different measurement points on the surface of the magnetic layer (n=3). An arithmetic mean of the three measurement results obtained by such measurement is defined as the number of recesses having an equivalent circle diameter of 0.20 μm to 0.50 μm existing on the surface of the magnetic layer of the magnetic tape to be measured. In a plane image of the surface of the magnetic layer obtained by using the AFM, a surface of the measurement area equivalent to volumes of protrusion components and recess components is defined as a reference surface, and a portion detected as a portion recessed from this reference surface is specified as a "recess". The portion specified as the recess may be a recess, a part of which is within the measurement area and the other part of which is beyond the measurement area. In a case of obtaining the number of recesses, the number of recesses is measured by including such a recess. In the plane image of the surface of the magnetic layer obtained by using the AFM, the area of the portion specified as the recess (hereinafter, "area A") is measured, and an equivalent circle diameter L is calculated by $(A/\pi)^{(1/2)} \times 2 = L$. Here, an operator "^" represents exponentiation. The equivalent circle diameter is obtained as a value in unit of μm and calculated in 0.01 μm increments by rounding off three digits after the decimal point and rounding down four digits after the decimal point. As an example of the measurement condition of the AFM, the following measurement conditions can be used.

The measurement regarding a region of the surface of the magnetic layer of the magnetic tape having an area of 40 μm×40 μm is performed with an AFM (Nanoscope 5 manufactured by BRUKER Corporation) in a peak force tapping mode. SCANASYST-AIR manufactured by BRUKER Corporation is used as a probe, a resolution is set as 512 pixels×512 pixels, and a scan speed is set by the measurement regarding 1 screen (512 pixels×512 pixels) for 512 seconds.

The number of recesses having an equivalent circle diameter of 0.20 μm to 0.50 μm existing on the surface of the magnetic layer of the magnetic tape is preferably 10 to 500 per 40 μm×40 μm area. In this regard, the present inventors have surmised that the number of recesses having the size in the range described above existing on the surface of the magnetic layer contribute to enable more evenly drawing the magnetic tape in a case of drawing the magnetic tape from the core in the magnetic tape container and/or stabilize a contact state between a magnetic tape transport system (for example, guide or the like) and the magnetic tape, and as a result, it is possible to suppress the position deviation in the width direction in the short period described above. From such a viewpoint, the number of recesses having an equivalent circle diameter in the range described above is preferably 500 or less, more preferably 400 or less, even more preferably 300 or less, and still preferably 200 or less. In addition, from such a viewpoint, the number of recesses having an equivalent circle diameter in the range described above is preferably 10 or more, more preferably 50 or more, and even more preferably 100 or more.

An example of a method for controlling the number of recesses will be described in detail later.

Vertical Squareness Ratio

In the one embodiment, the vertical squareness ratio of the magnetic tape can be, for example, 0.55 or more, and is preferably 0.60 or more. It is preferable that the vertical squareness ratio of the magnetic tape is 0.60 or more, from a viewpoint of improving the electromagnetic conversion characteristics. In principle, an upper limit of the squareness ratio is 1.00 or less. The vertical squareness ratio of the magnetic tape can be 1.00 or less, 0.95 or less, 0.90 or less, 0.85 or less, or 0.80 or less. It is preferable that the value of the vertical squareness ratio of the magnetic tape is large from a viewpoint of improving the electromagnetic conversion characteristics. The vertical squareness ratio of the magnetic tape can be controlled by a well-known method such as performing a homeotropic alignment process.

In the invention and the specification, the "vertical squareness ratio" is squareness ratio measured in the vertical direction of the magnetic tape. The "vertical direction" described with respect to the squareness ratio is a direction orthogonal to the surface of the magnetic layer, and can also be referred to as a thickness direction. In the invention and the specification, the vertical squareness ratio is obtained by the following method.

A sample piece having a size that can be introduced into an oscillation sample type magnetic-flux meter is cut out from the magnetic tape to be measured. Regarding the sample piece, using the oscillation sample type magnetic-flux meter, a magnetic field is applied to a vertical direction of a sample piece (direction orthogonal to the surface of the magnetic layer) with a maximum applied magnetic field of 3979 kA/m, a measurement temperature of 296 K, and a magnetic field sweep speed of 8.3 kA/m/sec, and a magnetization strength of the sample piece with respect to the applied magnetic field is measured. The measured value of the magnetization strength is obtained as a value after diamagnetic field correction and a value obtained by subtracting magnetization of a sample probe of the oscillation sample type magnetic-flux meter as background noise. In a case where the magnetization strength at the maximum applied magnetic field is Ms and the magnetization strength at zero applied magnetic field is Mr, the squareness ratio SQ is a value calculated as SQ=Mr/Ms. The measurement temperature is referred to as a temperature of the sample piece, and by setting the ambient temperature around the sample piece to a measurement temperature, the temperature of the sample piece can be set to the measurement temperature by realizing temperature equilibrium.

Curvature of Magnetic Tape in Longitudinal Direction

In the one embodiment, the curvature of the magnetic tape in the longitudinal direction can be, for example, 5 mm/m or less, and is preferably 4 mm/m or less. It is preferable that the curvature is 4 mm/m or less from the viewpoint of reducing the value of the reference circle center position deviation described above. The amount of curvature of the magnetic tape in the longitudinal direction may be, for example, 3 mm/m or less, 2 mm/m or less, or 1 mm/m or less. The amount of curvature can be 0 mm/m or more or more than 0 mm/m, and can also be 0 mm/m. The curvature can be controlled by adjusting the manufacturing conditions of the manufacturing step of the magnetic tape. This point will be described later in detail.

The curvature of the magnetic tape in the longitudinal direction of the present invention and the present specification is a value obtained by the following method in an environment of an atmosphere temperature of 23° C. and a relative humidity of 50%.

Figure 7:
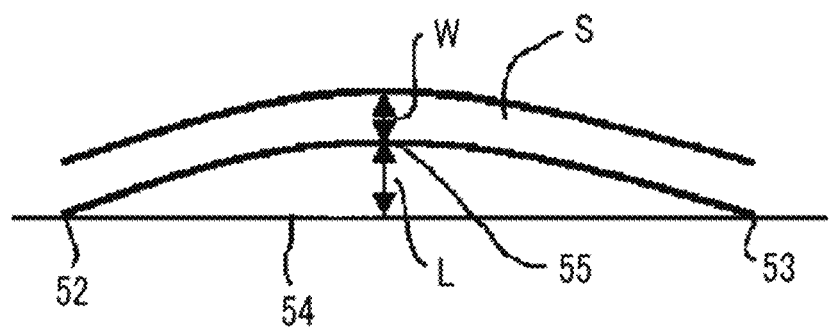
FIG. 7 is an explanatory diagram of a curvature of a magnetic tape in a longitudinal direction.

FIG. 7 is an explanatory diagram of a curvature of a magnetic tape in a longitudinal direction.

A tape sample having a length of 1 m in a longitudinal direction is cut out from a randomly selected portion of the magnetic tape to be measured. The tape sample is hung for 24 hours±4 hours in a tension-free state by gripping an upper end portion with a gripping member (clip or the like) by setting the longitudinal direction as the vertical direction. Then, within 1 hour, the following measurement is performed.

As shown in FIG. 7, the tape piece is placed on a flat surface in a tension-free state. The tape piece may be placed on a flat surface with the surface on the magnetic layer side facing upward, or may be placed on a flat surface with the other surface facing upward. In FIG. 7, S indicates a tape sample and W indicates the width direction of the tape sample. Using an optical microscope, a distance L (unit: mm) that is a shortest distance between a virtual line 54 connecting both terminal portions 52 and 53 of the tape sample S and a maximum curved portion 55 in the longitudinal direction of the tape sample S is measured. FIG. 7 shows an example in which the tape sample is curved upward on a paper surface. Even in a case where the tape sample is curved downward, the distance L (mm) is measured in the same manner. The distance L is displayed as a positive value regardless of which side is curved. In a case where no curve in the longitudinal direction is confirmed, the L is set to 0 (zero) mm. The measurement is performed with five different tape samples, and thus an arithmetic mean of values measured regarding the tape samples having a length of 1 m is defined as the curvature (unit: mm/m) of the magnetic tape to be measured in the longitudinal direction.

Magnetic Layer

Ferromagnetic Powder

As the ferromagnetic powder included in the magnetic layer of the magnetic tape, a well-known ferromagnetic powder can be used as one kind or in combination of two or more kinds as the ferromagnetic powder used in the magnetic layer of various magnetic recording media. It is preferable to use a ferromagnetic powder having a small average particle size as the ferromagnetic powder, from a viewpoint of improvement of a recording density. From this viewpoint, an average particle size of the ferromagnetic powder is preferably equal to or smaller than 50 nm, more preferably equal to or smaller than 45 nm, even more preferably equal to or smaller than 40 nm, further preferably equal to or smaller than 35 nm, further more preferably equal to or smaller than 30 nm, further even more preferably equal to or smaller than 25 nm, and still preferably equal to or smaller than 20 nm. Meanwhile, from a viewpoint of stability of magnetization, the average particle size of the ferromagnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm.

Hexagonal Ferrite Powder

As a preferred specific example of the ferromagnetic powder, a hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one embodiment of the hexagonal ferrite powder will be described more specifically.

An activation volume of the hexagonal strontium ferrite powder is preferably in a range of 800 to 1,600 nm$^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 nm$^3$, and can also be, for example, equal to or greater than 850 nm$^3$. In addition, from a viewpoint of further improving the electromagnetic conversion characteristics, the activation volume of the hexagonal strontium ferrite powder is more preferably equal to or smaller than 1,500 nm$^3$, even more preferably equal to or smaller than 1,400 nm$^3$, still preferably equal to or smaller than 1,300 nm$^3$, still more preferably equal to or smaller than 1,200 nm$^3$, and still even more preferably equal to or smaller than 1,100 nm$^3$. The same applies to the activation volume of the hexagonal barium ferrite powder.

The "activation volume" is a unit of magnetization reversal and an indicator showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc = 2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10$^5$ J/m$^3$, and more preferably have Ku equal to or greater than 2.0×10$^5$ J/m$^3$. In addition, Ku of the hexagonal strontium ferrite powder can be, for example, equal to or smaller than 2.5×10$^5$ J/m$^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In the one embodiment, the hexagonal strontium ferrite powder including the rare earth atom can have a rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0.

The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder towards the inside from the surface.

In a case where the hexagonal strontium ferrite powder includes the rare earth atom, a content (bulk content) of the rare earth atom is preferably 0.5 to 5.0 atom % with respect to 100 atom % of the iron atom. It is thought that the rare earth atom having the bulk content in the range described above and uneven distribution of the rare earth atom in the surface layer portion of the particles configuring the hexagonal strontium ferrite powder contribute to the prevention of a decrease in reproducing output during the repeated reproducing. It is surmised that this is because the rare earth atom having the bulk content in the range described above included in the hexagonal strontium ferrite powder and the uneven distribution of the rare earth atom in the surface layer portion of the particles configuring the hexagonal strontium ferrite powder can increase the anisotropy constant Ku. As the value of the anisotropy constant Ku is high, occurrence of a phenomenon called thermal fluctuation (that is, improvement of thermal stability) can be prevented. By preventing the occurrence of the thermal fluctuation, a decrease in reproducing output during the repeated reproducing can be prevented. It is surmised that the uneven distribution of the rare earth atom in the surface layer portion of the particles of the hexagonal strontium ferrite powder contributes to stabilization of a spin at an iron (Fe) site in a crystal lattice of the surface layer portion, thereby increasing the anisotropy constant Ku.

In addition, it is surmised that the use of the hexagonal strontium ferrite powder having the rare earth atom surface layer portion uneven distribution as the ferromagnetic powder of the magnetic layer also contributes to the prevention of chipping of the surface of the magnetic layer due to the sliding with the magnetic head. That is, it is surmised that, the hexagonal strontium ferrite powder having the rare earth atom surface layer portion uneven distribution can also contribute to the improvement of running durability of the magnetic tape. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving strength of the magnetic layer.

From a viewpoint of even more preventing reduction of the reproduction output in the repeated reproduction and/or a viewpoint of further improving running durability, the content of rare earth atom (bulk content) is more preferably in a range of 0.5 to 4.5 atom %, even more preferably in a range of 1.0 to 4.5 atom %, and still preferably in a range of 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of even more preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atoms are unevenly distributed in the surface layer portion (that is, a larger amount of the rare earth atoms is present, compared to that inside), in the particles configuring the hexagonal strontium ferrite powder. A ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by, for example, a method disclosed in a paragraph 0032 of JP2015-91747A.

The partial dissolving means dissolving performed so that the hexagonal strontium ferrite powder remaining in the solution can be visually confirmed in a case of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed in a case of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 mL of hydrochloric acid having a concentration of 1 mol/L is held on a hot plate at a set temperature of 70° C. for 1 hour. The obtained solution is filtered with a membrane filter having a hole diameter of 0.1 μm. The element analysis of the filtrate obtained as described above is performed by an inductively coupled plasma (ICP) analysis device. By doing so, the surface layer portion content of the rare earth atom with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 mL of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic tape, it is desirable that the mass magnetization σs of ferromagnetic powder included in the magnetic tape is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that, hexagonal strontium ferrite powder having the rare earth atom surface layer portion uneven distribution is also preferable for preventing such a significant decrease in σs. In one embodiment, σs of the hexagonal strontium ferrite powder can be equal to or greater than 45 A×m$^2$/kg and can also be equal to or greater than 47 A×m$^2$/kg. On the other hand, from a viewpoint of noise reduction, σS is preferably equal to or smaller than 80 A×m$^2$/kg and more preferably equal to or smaller than 60 A×m$^2$/kg. σs can be measured by using a well-known measurement device capable of measuring magnetic properties such as an oscillation sample type magnetic-flux meter. In the invention and the specification, the mass magnetization σS is a value measured at a magnetic field strength of 15 kOe, unless otherwise noted. 1 [kOe]=(10$^6$/4π) [A/m]

Regarding the content (bulk content) of the constituting atom in the hexagonal strontium ferrite powder, a content of the strontium atom can be, for example, 2.0 to 15.0 atom % with respect to 100 atom % of the iron atom. In one embodiment, in the hexagonal strontium ferrite powder, the divalent metal atom included in this powder can be only a strontium atom. In another embodiment, the hexagonal strontium ferrite powder can also include one or more kinds of other divalent metal atoms, in addition to the strontium atom. For example, the hexagonal strontium ferrite powder can include a barium atom and/or a calcium atom. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one embodiment, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can also include a rare earth atom. In addition, the hexagonal strontium ferrite powder may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of even more preventing the reduction of the reproduction output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one embodiment, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one embodiment, the hexagonal strontium ferrite powder does not include a bismuth atom (Bi).

Metal Powder

As a preferred specific example of the ferromagnetic powder, a ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a manufacturing method of the ε-iron oxide powder, a manufacturing method from a goethite, a reverse micelle method, and the like are known. All of the manufacturing methods are well known. For the method of manufacturing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. S280-S284, J. Mater. Chem. C, 2013, 1, pp. 5200-5206 can be referred, for example. However, the manufacturing method of the ε-iron oxide powder capable of being used as the ferromagnetic powder in the magnetic layer of the magnetic tape is not limited to the method described here.

An activation volume of the ε-iron oxide powder is preferably 300 to 1,500 $nm^3$. The atomized ε-iron oxide powder showing the activation volume in the range described above is suitable for manufacturing a magnetic tape exhibiting excellent electromagnetic conversion characteristics. The activation volume of the ε-iron oxide powder is preferably equal to or greater than 300 $nm^3$, and can also be, for example, equal to or greater than 500 $nm^3$. In addition, from a viewpoint of further improving the electromagnetic conversion characteristics, the activation volume of the ε-iron oxide powder is more preferably equal to or smaller than 1,400 $nm^3$, even more preferably equal to or smaller than 1,300 $nm^3$, still preferably equal to or smaller than 1,200 $nm^3$, and still more preferably equal to or smaller than 1,100 $nm^3$.

The anisotropy constant Ku can be used as an index of reduction of thermal fluctuation, that is, improvement of thermal stability. The ε-iron oxide powder can preferably have Ku equal to or greater than $3.0 \times 10^4$ $J/m^3$, and more preferably have Ku equal to or greater than $8.0 \times 10^4$ $J/m^3$. In addition, Ku of the ε-iron oxide powder can be, for example, equal to or smaller than $3.0 \times 10^5$ $J/m^3$. However, the high Ku is preferable, because it means high thermal stability, and thus, Ku is not limited to the exemplified value.

From a viewpoint of increasing reproducing output in a case of reproducing data recorded on a magnetic tape, it is desirable that the mass magnetization σs of ferromagnetic powder included in the magnetic tape is high. In regard to this point, in one embodiment, σs of the ε-iron oxide powder can be equal to or greater than 8 $A \times m^2/kg$ and can also be equal to or greater than 12 $A \times m^2/kg$. On the other hand, from a viewpoint of noise reduction, σs of the ε-iron oxide powder is preferably equal to or smaller than 40 $A \times m^2/kg$ and more preferably equal to or smaller than 35 $A \times m^2/kg$.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed onto a photographic printing paper so that a total magnification ratio of 500,000 of an image of particles configuring the powder is obtained. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetic mean of the particle size of 500 particles obtained as described above is the average particle size of the powder. As the transmission electron microscope, a transmission electron microscope H-9000 manufactured by Hitachi, Ltd. can be used, for example. In addition, the measurement of the particle size can be performed by a well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an embodiment in which particles configuring the aggregate are directly in contact with each other, but also includes an embodiment in which a binding agent or an additive which will be described later is interposed between the particles. A term, particles may be used for representing the powder.

As a method for collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a major axis configuring the particle, that is, a major axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the major axis configuring the particles cannot be specified from the shape, the particle size is shown as an equivalent circle diameter. The equivalent circle diameter is a value obtained by a circle projection method.

In addition, regarding an average acicular ratio of the powder, a length of a minor axis, that is, a minor axis length of the particles is measured in the measurement described above, a value of (major axis length/minor axis length) of each particle is obtained, and an arithmetic mean of the values obtained regarding 500 particles is calculated. Here, unless otherwise noted, in a case of (1), the minor axis length as the definition of the particle size is a length of a minor axis configuring the particle, in a case of (2), the minor axis length is a thickness or a height, and in a case of (3), the major axis and the minor axis are not distinguished, thus, the value of (major axis length/minor axis length) is assumed as 1, for convenience.

In addition, unless otherwise noted, in a case where the shape of the particle is specified, for example, in a case of definition of the particle size (1), the average particle size is an average major axis length, and in a case of the same definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass with respect to a total mass of the magnetic layer. A high filling percentage of the ferromagnetic powder in the magnetic layer is preferable from a viewpoint of improvement of recording density.

Binding Agent

The magnetic tape may be a coating type magnetic tape, and can include a binding agent in the magnetic layer. The binding agent is one or more kinds of resin. As the binding agent, various resins normally used as a binding agent of a coating type magnetic tape can be used. As the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the non-magnetic layer and/or a back coating layer which will be described later.

For the binding agent described above, descriptions disclosed in paragraphs 0028 to 0031 of JP2010-24113A can be referred to. An average molecular weight of the resin used as the binding agent can be, for example, 10,000 to 200,000 as a weight-average molecular weight. The amount of the binding agent used can be, for example, 1.0 to 30.0 parts by mass with respect to 100.0 parts by mass of the ferromagnetic powder.

Curing Agent

A curing agent can also be used together with the resin which can be used as the binding agent. As the curing agent, in one embodiment, a thermosetting compound which is a compound in which a curing reaction (crosslinking reaction) proceeds due to heating can be used, and in another embodiment, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, and polyisocyanate is suitable. For the details of polyisocyanate, descriptions disclosed in paragraphs 0124 and 0125 of JP2011-216149A can be referred to. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer may include one or more kinds of additives, as necessary. As the additives, a commercially available product can be suitably selected and used according to the desired properties. Alternatively, a compound synthesized by a well-known method can be used as the additives. The additive can be used with a random amount. As the additives, the curing agent described above is used as an example. In addition, examples of the additive included in the magnetic layer include a non-magnetic powder (for example, inorganic powder, carbon black, or the like), a lubricant, a dispersing agent, a dispersing assistant, a fungicide, an antistatic agent, and an antioxidant. For example, for the lubricant, a description disclosed in paragraphs 0030 to 0033, 0035, and 0036 of JP2016-126817A can be referred to. The lubricant may be included in the non-magnetic layer which will be described later. For the lubricant which may be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be added to a non-magnetic layer forming composition. For the dispersing agent which can be added to the non-magnetic layer forming composition, a description disclosed in paragraph 0061 of JP2012-133837A can be referred to. As the non-magnetic powder which may be included in the magnetic layer, non-magnetic powder which can function as an abrasive, non-magnetic powder (for example, non-magnetic colloid particles) which can function as a projection formation agent which forms projections suitably protruded from the surface of the magnetic layer, and the like can be used. For example, for the abrasive, a description disclosed in paragraphs 0030 to 0032 of JP2004-273070A can be referred to. As the projection formation agent, colloidal particles are preferable, and from a viewpoint of availability, inorganic colloidal particles are preferable, inorganic oxide colloidal particles are more preferable, and silica colloidal particles (colloidal silica) are even more preferable. Average particle sizes of the abrasive and the projection formation agent are respectively preferably 30 to 200 nm and more preferably 50 to 100 nm.

The magnetic layer described above can be provided on the surface of the non-magnetic support directly or indirectly through the non-magnetic layer.

Non-Magnetic Layer

Next, the non-magnetic layer will be described. The magnetic tape may include a magnetic layer directly on the surface of the non-magnetic support or may include a magnetic layer on the surface of the non-magnetic support through the non-magnetic layer including the non-magnetic powder. The non-magnetic powder used in the non-magnetic layer may be a powder of an inorganic substance or a powder of an organic substance. In addition, carbon black and the like can be used. Examples of powder of the inorganic substance include powder of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50% to 90% by mass and more preferably 60% to 90% by mass with respect to a total mass of the non-magnetic layer.

The non-magnetic layer can include a binding agent and can also include additives. In regards to other details of a binding agent and additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate and polyethylene naphthalate, are preferable.

In the one embodiment, the non-magnetic support of the magnetic tape can be an aromatic polyester support. In the invention and the specification, "aromatic polyester" means a resin including an aromatic skeleton and a plurality of ester bonds, and the "aromatic polyester support" means a support including at least one layer of an aromatic polyester film. The "aromatic polyester film" is a film in which the largest component in the component configuring this film based on mass is aromatic polyester. The "aromatic polyester support" of the invention and the specification include a support in which all of resin films included in this support is the aromatic polyester film and a support including the aromatic polyester film and the other resin film. Specific examples of the aromatic polyester support include a single aromatic polyester film, a laminated film of two or more layers of the aromatic polyester film having the same constituting component, a laminated film of two or more layers of the aromatic polyester film having different constituting components, and a laminated film including one or more layers of the aromatic polyester film and one or more layers of resin film other than the aromatic polyester. In the laminated film, an adhesive layer or the like may be randomly included between two adhesive layers. In addition, the aromatic polyester support may randomly include a metal film and/or a metal oxide film formed by performing vapor deposition or the like on one or both surfaces. The same applies to a "polyethylene terephthalate support" and a "polyethylene naphthalate support" in the invention and the specification.

An aromatic ring included in an aromatic skeleton including the aromatic polyester is not particularly limited. Specific examples of the aromatic ring include a benzene ring and naphthalene ring.

For example, polyethylene terephthalate (PET) is polyester including a benzene ring, and is a resin obtained by polycondensation of ethylene glycol and terephthalic acid and/or dimethyl terephthalate. The "polyethylene terephthalate" of the invention and the specification includes polyethylene terephthalate having a structure including one or more kinds of other components (for example, copolymerization component, and component introduced to a terminal or a side chain), in addition to the component described above.

Polyethylene naphthalate (PEN) is polyester including a naphthalene ring, and is a resin obtained by performing esterification reaction of dimethyl 2,6-naphthalenedicarboxylate and ethylene glycol, and then, transesterification and polycondensation reaction. The "polyethylene naphthalate" of the invention and the specification includes polyethylene naphthalate having a structure including one or more kinds of other components (for example, copolymerization component, and component introduced to a terminal or a side chain), in addition to the component described above.

In addition, the non-magnetic support can be a biaxial stretching film, and may be a film subjected to corona discharge, plasma treatment, easy adhesion treatment, heat treatment, or the like.

Back Coating Layer

The magnetic tape may or may not include a back coating layer including a non-magnetic powder on a surface side of the non-magnetic support opposite to the surface side provided with the magnetic layer. For the non-magnetic powder of the back coating layer, the above description regarding the non-magnetic powder of the non-magnetic layer can be referred to.

In a manufacturing step and the like of the magnetic tape, the surface shape of the rear surface is transferred to the surface of the magnetic layer (so-called offset) while the front surface and the rear surface of the magnetic layer are in contact with each other in a rolled state, thereby forming a recess on the surface of the magnetic layer. The rear surface is the surface of the back coating layer in a case of including the back coating layer, is a surface of the support in a case of not including the back coating layer. As an example of a method for controlling the existence state of recess on the surface of the magnetic layer, a type of component to be added to the composition for forming the back coating layer, for example, can be selected, in order to adjust the surface shape of the rear surface. From this viewpoint, as the non-magnetic powder of the back coating layer, it is preferable that carbon black and a non-magnetic powder other than carbon black are used in combination, or carbon black is used (that is, the non-magnetic powder of the back coating layer consists of carbon black). Examples of the non-magnetic powder other than carbon black include the non-magnetic powder exemplified above as one that can be contained in the non-magnetic layer. Regarding the non-magnetic powder of the back coating layer, a percentage of carbon black with respect to 100.0 parts by mass of the total amount of the non-magnetic powder is preferably in a range of 50.0 to 100.0 parts by mass, more preferably in a range of 70.0 to 100.0 parts by mass, even more preferably in a range of 90.0 to 100.0 parts by mass. In addition, it is also preferable that the total amount of the non-magnetic powder in the back coating layer is carbon black. The content (filling percentage) of the non-magnetic powder in the back coating layer is preferably in a range of 50 to 90% by mass and more preferably in a range of 60 to 90% by mass, with respect to the total mass of the back coating layer.

From a viewpoint of ease of control of the number of recesses having the equivalent circle diameter in the range described above existing on the surface of the magnetic layer, in the one embodiment, a non-magnetic powder having an average particle size of 50 nm or less is preferably used as the non-magnetic powder of the back coating layer. As the non-magnetic powder of the back coating layer, only one kind of the non-magnetic powder may be used or two or more kinds thereof may be used. In a case of using two or more kinds (for example, carbon black and a non-magnetic powder other than carbon black), the average particle size of each is preferably 50 nm or less. The average particle size of the non-magnetic powder is more preferably in a range of 10 to 50 nm and even more preferably in a range of 10 to 30 nm. In the one embodiment, a total amount of the non-magnetic powder contained in the back coating layer is preferably carbon black and the average particle size thereof is more preferably 50 nm or less.

In order to control the existence state of the recesses on the surface of the magnetic layer, the back coating layer forming composition preferably contains a component (dispersing agent) capable of increasing the dispersibility of the non-magnetic powder contained in this composition. The back coating layer forming composition more preferably contains a non-magnetic powder having an average particle size of 50 nm or less and a component capable of increasing dispersibility of this non-magnetic powder, and even more preferably contains carbon black having an average particle size of 50 nm or less and a component capable of increasing the dispersibility of carbon black.

As an example of such a dispersing agent, a compound having an ammonium salt structure of an alkyl ester anion represented by Formula 1 can be used. The "alkyl ester anion" can also be referred to as an "alkyl carboxylate anion".

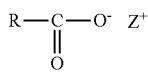

Formula 1

In Formula 1, R represents an alkyl group having 7 or more carbon atoms or a fluorinated alkyl group having 7 or more carbon atoms, and $Z^+$ represents an ammonium cation.

In addition, from a viewpoint of improving the dispersibility of carbon black, in the one embodiment, two or more kinds of components capable of forming the compound having a salt structure can be used in a case of preparing the back coating layer forming composition. Accordingly, in a case of preparing the back coating layer forming composition, at least some of these components can form the compound having the salt structure.

Unless otherwise noted, groups described below may have a substituent or may be unsubstituted. In addition, the "number of carbon atoms" of a group having a substituent means the number of carbon atoms not including the number of carbon atoms of the substituent, unless otherwise noted. In the present invention and the specification, examples of the substituent include an alkyl group (for example, an alkyl group having 1 to 6 carbon atoms), a hydroxy group, an alkoxy group (for example, an alkoxy group having 1 to 6 carbon atoms), a halogen atom (for example, a fluorine atom, a chlorine atom, a bromine atom, or the like), a cyano group, an amino group, a nitro group, an acyl group, a carboxy group, salt of a carboxy group, a sulfonic acid group, and salt of a sulfonic acid group.

Hereinafter, Formula 1 will be described in more detail.

In Formula 1, R represents an alkyl group having 7 or more carbon atoms or a fluorinated alkyl group having 7 or more carbon atoms. The fluorinated alkyl group has a structure in which some or all of the hydrogen atoms constituting the alkyl group are substituted with a fluorine atom. The alkyl group or fluorinated alkyl group represented by R may have a linear structure, a branched structure, may be a cyclic alkyl group or fluorinated alkyl group, and preferably has a linear structure. The alkyl group or fluorinated alkyl group represented by R may have a substituent, may be unsubstituted, and is preferably unsubstituted. The alkyl group represented by R can be represented by, for example, $C_nH_{2n+1}$—. Here, n represents an integer of 7 or more. In addition, for example, the fluorinated alkyl group represented by R may have a structure in which a part or all of the hydrogen atoms constituting the alkyl group represented by $C_nH_{2n+1}$— are substituted with a fluorine atom. The alkyl group or fluorinated alkyl group represented by R has 7 or more carbon atoms, preferably 8 or more carbon atoms, more preferably 9 or more carbon atoms, further preferably 10 or more carbon atoms, still preferably 11 or more carbon atoms, still more preferably 12 or more carbon atoms, and still even more preferably 13 or more carbon atoms. The alkyl group or fluorinated alkyl group represented by R has preferably 20 or less carbon atoms, more preferably 19 or less carbon atoms, and even more preferably 18 or less carbon atoms.

In Formula 1, $Z^+$ represents an ammonium cation. Specifically, the ammonium cation has the following structure. In the present invention and the present specification, "*" in the formulas that represent a part of the compound represents a bonding position between the structure of the part and the adjacent atom.

The nitrogen cation $N^+$ of the ammonium cation and the oxygen anion $O^-$ in Formula 1 may form a salt bridging group to form the ammonium salt structure of the alkyl ester anion represented by Formula 1. The fact that the compound having the ammonium salt structure of the alkyl ester anion represented by Formula 1 is contained in the back coating layer can be confirmed by performing analysis with respect to the magnetic tape by X-ray photoelectron spectroscopy (electron spectroscopy for chemical analysis (ESCA)), infrared spectroscopy (IR), or the like.

In the one embodiment, the ammonium cation represented by $Z^+$ can be provided by, for example, the nitrogen atom of the nitrogen-containing polymer becoming a cation. The nitrogen-containing polymer means a polymer containing a nitrogen atom. In the present invention and the present specification, a term "polymer" means to include both a homopolymer and a copolymer. The nitrogen atom can be included as an atom configuring a main chain of the polymer in one embodiment, and can be included as an atom constituting a side chain of the polymer in one embodiment.

As one embodiment of the nitrogen-containing polymer, polyalkyleneimine can be used. The polyalkyleneimine is a ring-opening polymer of alkyleneimine and is a polymer having a plurality of repeating units represented by Formula 2.

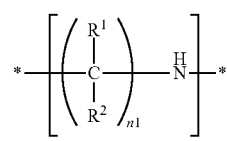

Formula 2

The nitrogen atom N configuring the main chain in Formula 2 can be converted to a nitrogen cation $N^+$ to provide an ammonium cation represented by $Z^+$ in Formula 1. Then, an ammonium salt structure can be formed with the alkyl ester anion, for example, as follows.

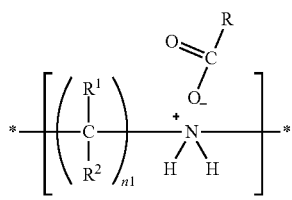

Hereinafter, Formula 2 will be described in more detail.

In Formula 2, $R^1$ and $R^2$ each independently represent a hydrogen atom or an alkyl group, and n1 represents an integer of 2 or more.

Examples of the alkyl group represented by $R^1$ or $R^2$ include an alkyl group having 1 to 6 carbon atoms, preferably an alkyl group having 1 to 3 carbon atoms, more preferably a methyl group or an ethyl group, and even more preferably a methyl group. The alkyl group represented by $R^1$ or $R^2$ is preferably an unsubstituted alkyl group. A combination of $R^1$ and $R^2$ in Formula 2 is a form in which one is a hydrogen atom and the other is an alkyl group, a form in which both are hydrogen atoms, and a form in which both are an alkyl group (the same or different alkyl groups), and is preferably a form in which both are hydrogen atoms. As the alkyleneimine that provides the polyalkyleneimine, a structure of the ring that has the smallest number of carbon atoms is ethyleneimine, and the main chain of the alkyleneimine (ethyleneimine) obtained by ring opening of ethyleneimine has 2 carbon atoms. Accordingly, n1 in Formula 2 is 2 or more. n1 in Formula 2 can be, for example, 10 or less, 8 or less, 6 or less, or 4 or less. The polyalkyleneimine may be a homopolymer containing only the same structure as the repeating structure represented by Formula 2, or may be a copolymer containing two or more different structures as the repeating structure represented by Formula 2. A number average molecular weight of the polyalkyleneimine that can be used to form the compound having the ammonium salt structure of the alkyl ester anion represented by Formula 1 can be, for example, equal to or greater than 200, and is preferably equal to or greater than 300, and more preferably equal to or greater than 400. In addition, the number average molecular weight of the polyalkyleneimine can be, for example, equal to or less than 10,000, and is preferably equal to or less than 5,000 and more preferably equal to or less than 2,000.

In the present invention and the present specification, the average molecular weight (weight-average molecular weight and number average molecular weight) is measured by gel permeation chromatography (GPC) and is a value obtained by performing standard polystyrene conversion. Unless otherwise noted, the average molecular weights shown in the examples which will be described below are values (polystyrene-equivalent values) obtained by standard polystyrene conversion of the values measured under the following measurement conditions using GPC.

GPC device: HLC-8220 (manufactured by Tosoh Corporation)

Guard Column: TSK guard column Super HZM-H

Column: TSK gel Super HZ 2000, TSK gel Super HZ 4000, TSK gel Super HZ-M (manufactured by Tosoh Corporation, 4.6 mm (inner diameter)×15.0 cm, three kinds of columns are linked in series)

Eluent: Tetrahydrofuran (THF), including stabilizer (2,6-di-t-butyl-4-methylphenol)

Eluent flow rate: 0.35 mL/min

Column temperature: 40° C.

Inlet temperature: 40° C.

Refractive index (RI) measurement temperature: 40° C.

Sample concentration: 0.3% by mass

Sample injection amount: 10 μL

In addition, as the other embodiment of the nitrogen-containing polymer, polyallylamine can be used. The polyallylamine is a polymer of allylamine and is a polymer having a plurality of repeating units represented by Formula 3.

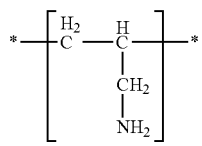

Formula 3

The nitrogen atom N configuring an amino group of a side chain in Formula 3 can be converted to a nitrogen cation $N^+$ to provide an ammonium cation represented by $Z^+$ in Formula 1. Then, an ammonium salt structure can be formed with the alkyl ester anion, for example, as follows.

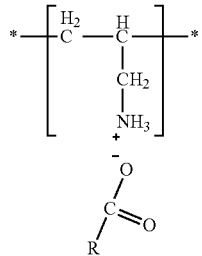

A weight-average molecular weight of the polyallylamine that can be used to form the compound having the ammonium salt structure of the alkyl ester anion represented by Formula 1 can be, for example, equal to or greater than 200, and is preferably equal to or greater than 1,000, and more preferably equal to or greater than 1,500. In addition, the weight-average molecular weight of the polyallylamine can be, for example, equal to or less than 15,000, and is preferably equal to or less than 10,000 and more preferably equal to or less than 8,000.

The fact that the compound having a structure derived from polyalkyleneimine or polyallylamine as the compound having the ammonium salt structure of the alkyl ester anion represented by Formula 1 is included in the back coating layer can be confirmed by analyzing the surface of the back coating layer by a time-of-flight secondary ion mass spectrometry (TOF-SIMS) or the like.

The compound having the ammonium salt structure of the alkyl ester anion represented by Formula 1 can be salt of a nitrogen-containing polymer and one or more fatty acids selected from the group consisting of fatty acids having 7 or more carbon atoms or fluorinated fatty acids having 7 or more carbon atoms. The nitrogen-containing polymer forming salt can be one kind or two or more kinds of nitrogen-containing polymers, and can be, for example, a nitrogen-containing polymer selected from the group consisting of polyalkyleneimine or polyallylamine. The fatty acids forming the salt can be one kind or two or more kinds of fatty acids selected from the group consisting of fatty acids having 7 or more carbon atoms or fluorinated fatty acids having 7 or more carbon atoms. The fluorinated fatty acid has a structure in which some or all of the hydrogen atoms configuring the alkyl group bonded to a carboxy group COOH in the fatty acid are substituted with fluorine atoms. For example, the salt forming reaction can easily proceed by mixing the nitrogen-containing polymer and the fatty acids described above at room temperature. The room temperature is, for example, approximately 20° C. to 25° C. In the one embodiment, one or more kinds of nitrogen-containing polymers and one or more kinds of the fatty acids described above are used as components of the back coating layer forming composition, and the salt forming reaction can proceed by mixing these in the step of preparing the back coating layer forming composition. In the one embodiment, one or more kinds of nitrogen-containing polymers and one or more kinds of the fatty acids described above are mixed to form a salt before preparing the back coating layer forming composition, and then, the back coating layer forming composition can be prepared using this salt as a component of the back coating layer forming composition. In a case where the nitrogen-containing polymer and the fatty acid are mixed to form an ammonium salt of the alkyl ester anion represented by Formula 1, the nitrogen atom configuring the nitrogen-containing polymer and the carboxy group of the fatty acid may be reacted to form the following structure, and a form including such structures are also included in the above compound.

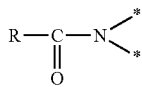

Examples of the fatty acids include fatty acids having an alkyl group described above as R in Formula 1 and fluorinated fatty acids having a fluorinated alkyl group described above as R in Formula 1.

A mixing ratio of the nitrogen-containing polymer and the fatty acid used to form the compound having the ammonium salt structure of the alkyl ester anion represented by Formula 1 is preferably 10:90 to 90:10, more preferably 20:80 to 85:15, and even more preferably 30:70 to 80:20, as a mass ratio of nitrogen-containing polymer:fatty acid. In addition, the used amount of the compound having the ammonium salt structure of the alkyl ester anion represented by Formula 1 can be, for example, 1.0 to 20.0 parts by mass and is preferably 1.0 to 10.0 parts by mass with respect to 100.0 parts by mass of carbon black, during preparation of the back coating layer forming composition. In addition, for example, in a case of preparing the back coating layer forming composition, 0.1 to 10.0 parts by mass of the nitrogen-containing polymer can be used and 0.5 to 8.0 parts by mass of the nitrogen-containing polymer is preferably used with respect to 100.0 parts by mass of carbon black. The used amount of the fatty acids described above can be, for example, 0.05 to 10.0 parts by mass and is preferably 0.1 to 5.0 parts by mass, with respect to 100.0 parts by mass of carbon black.

For the component contained in the back coating layer, the back coating layer can include a binding agent and can also include an additive. In regards to the binding agent included in the back coating layer and additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

Regarding a thickness (total thickness) of the magnetic recording medium, an increase in recording capacity (high capacity) of the magnetic tape is required in accordance with a great increase in information content in recent years. Regarding a tape-shaped magnetic recording medium (that is, a magnetic tape), as a unit for increasing the capacity, the thickness of the magnetic tape is decreased and a length of the magnetic tape accommodated in one roll of a magnetic tape cartridge is increased. From this point, the thickness (total thickness) of the magnetic tape is preferably 5.6 μm or less, more preferably 5.5 μm or less, even more preferably 5.4 μm or less, still preferably 5.3 μm or less, and still more preferably 5.2 μm or less. In addition, from a viewpoint of ease of handling, the thickness of the magnetic tape is preferably 3.0 μm or more and more preferably 3.5 μm or more.

The thickness (total thickness) of the magnetic tape can be measured by the following method.

Ten samples (for example, 5 to 10 cm in length) are cut out from any portion of the magnetic tape, and the samples are stacked to measure the thickness. A value (thickness per sample) obtained by calculating 1/10 of the measured thickness is set as the total thickness. The thickness measurement can be performed using a well-known measurement device capable of performing the thickness measurement at 0.1 μm order.

A thickness of the non-magnetic support is preferably 3.0 to 5.0 μm.

A thickness of the magnetic layer can be optimized according to a saturation magnetization amount of a magnetic head used, a head gap length, a recording signal band, and the like, is normally 0.01 μm to 0.15 μm, and is preferably 0.02 μm to 0.12 μm and more preferably 0.03 μm to 0.1 μm, from a viewpoint of realization of high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.1 to 1.5 μm and is preferably 0.1 to 1.0 μm.

A thickness of the back coating layer is preferably 0.9 μm or less and more preferably 0.1 to 0.7 μm.

Various thicknesses such as the thickness of the magnetic layer and the like can be obtained by the following method.

A cross section of the magnetic tape in the thickness direction is exposed with an ion beam and the cross section observation of the exposed cross section is performed using a scanning electron microscope or a transmission electron microscope. Various thicknesses can be obtained as the arithmetic mean of the thicknesses obtained at two random points in the cross section observation. Alternatively, various thicknesses can be obtained as a designed thickness calculated under the manufacturing conditions.

Manufacturing Step

Preparation of Each Layer Forming Composition

Composition for forming the magnetic layer, the non-magnetic layer, or the back coating layer generally includes a solvent, together with the various components described above. As the solvent, one kind or two or more kinds of various kinds of solvents usually used for producing a coating type magnetic recording medium can be used. The content of the solvent in each layer forming composition is not particularly limited. For the solvent, a description disclosed in a paragraph 0153 of JP2011-216149A can be referred to. A concentration of solid content and a solvent composition in each layer forming composition may be suitably adjusted according to handleability of the composition, coating conditions, and a thickness of each layer to be formed. A step of preparing a composition for forming the magnetic layer, the non-magnetic layer or the back coating layer can generally include at least a kneading step, a dispersing step, and a mixing step provided before and after these steps, in a case where necessary. Each step may be divided into two or more stages. Various components used in the preparation of each layer forming composition may be added at the beginning or during any step. In addition, each component may be separately added in two or more steps. For example, a binding agent may be separately added in a kneading step, a dispersing step, and a mixing step for adjusting viscosity after the dispersion. In the manufacturing step of the magnetic tape, a well-known manufacturing technology of the related art can be used as a part of step. In the kneading step, an open kneader, a continuous kneader, a pressure kneader, or a kneader having a strong kneading force such as an extruder can be used. The details of the kneading step are disclosed in JP1989-106338A (JP-H01-106338A) and JP1989-79274A (JP-H01-79274A). As a disperser, various well-known dispersers using a shear force such as a beads mill, a ball mill, a sand mill, or a homogenizer can be used. In the dispersion, the dispersion beads can be preferably used. As dispersion beads, ceramic beads or glass beads are used and zirconia beads are preferable. A combination of two or more kinds of beads may be used. A bead diameter (particle diameter) and a beads filling percentage of the dispersion beads are not particularly limited and may be set according to powder which is a dispersion target. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

Coating Step

The magnetic layer can be formed by directly applying the magnetic layer forming composition onto the surface of the non-magnetic support or performing multilayer coating of the magnetic layer forming composition with the non-magnetic layer forming composition in order or at the same time. The back coating layer can be formed by applying the back coating layer forming composition onto the surface of the non-magnetic support opposite to the surface provided with the non-magnetic layer and/or the magnetic layer (or non-magnetic layer and/or the magnetic layer is to be provided). For details of the coating for forming each layer, a description disclosed in a paragraph 0066 of JP2010-231843A can be referred to.

Other Steps

For various other steps for manufacturing the magnetic tape, a well-known technology can be applied. For details of the various steps, descriptions disclosed in paragraphs 0067 to 0070 of JP2010-231843A can be referred to, for example. For example, the coating layer of the magnetic layer forming composition can be subjected to an alignment process in an alignment zone, while the coating layer is wet. For the alignment process, various well-known technologies disclosed in a paragraph 0052 of JP2010-24113A can be applied. For example, a homeotropic alignment process can be performed by a well-known method such as a method using a different polar facing magnet. In the alignment zone, a drying speed of the coating layer can be controlled by a temperature and an air flow of the dry air and/or a transporting rate in the alignment zone. In addition, the coating layer may be preliminarily dried before transporting to the alignment zone. As an example, the magnetic field strength in a homeotropic alignment process can be 0.1 to 1.5 T.

Regarding the magnetic tape, a long magnetic tape raw material can be obtained through various steps. The obtained magnetic tape raw material is cut (slit) by a well-known cutter to have a width of a magnetic tape to be wound around the magnetic tape cartridge. The width is determined according to the standard and is, for example, ½ inches. In the magnetic tape obtained by slitting, a servo pattern can be formed. The formation of the servo pattern will be described later in detail.

Heat Treatment

In the one embodiment, the magnetic tape can be a magnetic tape manufactured through the following heat treatment. In another embodiment, the magnetic tape can be manufactured without the following heat treatment.

As the heat treatment, the magnetic tape slit and cut to have a width determined according to the standard described above can be wound around a core member and can be subjected to the heat treatment in the wound state.

In the one embodiment, the heat treatment is performed in a state where the magnetic tape is wound around the core member for heat treatment (hereinafter, referred to as a "core for heat treatment"), the magnetic tape after the heat treatment is wound around a cartridge reel of the magnetic tape cartridge, and a magnetic tape cartridge in which the magnetic tape is wound around the cartridge reel can be manufactured.

The core for heat treatment can be formed of metal, a resin, or paper. The material of the core for heat treatment is preferably a material having high stiffness, from a viewpoint of preventing the occurrence of a winding defect such as spoking or the like. From this viewpoint, the core for heat treatment is preferably formed of metal or a resin. In addition, as an index for stiffness, a modulus of bending elasticity of the material for the core for heat treatment is preferably equal to or greater than 0.2 GPa and more preferably equal to or greater than 0.3 GPa. Meanwhile, since the material having high stiffness is normally expensive, the use of the core for heat treatment of the material having stiffness exceeding the stiffness capable of preventing the occurrence of the winding defect causes the cost increase. By considering the viewpoint described above, the modulus of bending elasticity of the material for the core for heat treatment is preferably equal to or smaller than 250 GPa. In addition, the core for heat treatment can be a solid or hollow core member. In a case of a hollow shape, a wall thickness is preferably equal to or greater than 2 mm, from a viewpoint of maintaining the stiffness. In addition, the core for heat treatment may include or may not include a flange.

The magnetic tape having a length equal to or greater than a length to be finally accommodated in the magnetic tape cartridge (hereinafter, referred to as a "final product length") is prepared as the magnetic tape wound around the core for heat treatment, and it is preferable to perform the heat treatment by placing the magnetic tape in the heat treatment environment, in a state where the magnetic tape is wound around the core for heat treatment. The magnetic tape length wound around the core for heat treatment is equal to or greater than the final product length, and is preferably the "final product length+α", from a viewpoint of ease of winding around the core for heat treatment. This α is preferably equal to or greater than 5 m, from a viewpoint of ease of the winding. The tension in a case of winding around the core for heat treatment is preferably equal to or greater than 0.1 N (newton). In addition, from a viewpoint of preventing the occurrence of excessive deformation during the manufacturing, the tension in a case of winding around the core for heat treatment is preferably equal to or smaller than 1.5 N and more preferably equal to or smaller than 1.0 N. An outer diameter of the core for heat treatment is preferably equal to or greater than 20 mm and more preferably equal to or greater than 40 mm, from viewpoints of ease of the winding and preventing coiling (curl in longitudinal direction). The outer diameter of the core for heat treatment is preferably equal to or smaller than 100 mm and more preferably equal to or smaller than 90 mm. A width of the core for heat treatment may be equal to or greater than the width of the magnetic tape wound around this core. In addition, after the heat treatment, in a case of detaching the magnetic tape from the core for heat treatment, it is preferable that the magnetic tape and the core for heat treatment are sufficiently cooled and magnetic tape is detached from the core for heat treatment, in order to prevent the occurrence of the tape deformation which is not intended during the detaching operation. It is preferable the detached magnetic tape is wound around another core temporarily (referred to as a "core for temporary winding"), and the magnetic tape is wound around a cartridge reel (generally, outer diameter is approximately 40 to 50 mm) of the magnetic tape cartridge from the core for temporary winding. Accordingly, a relationship between the inside and the outside with respect to the core for heat treatment of the magnetic tape in a case of the heat treatment can be maintained and the magnetic tape can be wound around the cartridge reel of the magnetic tape cartridge. Regarding the details of the core for temporary winding and the tension in a case of winding the magnetic tape around the core, the description described above regarding the core for heat treatment can be referred to. In an embodiment in which the heat treatment is subjected to the magnetic tape having a length of the "final product length+α", the length corresponding to "+α" may be cut in any stage. For example, in one embodiment, the magnetic tape having the final product length may be wound around the cartridge reel of the magnetic tape cartridge from the core for temporary winding and the remaining length corresponding the "+α" may be cut. From a viewpoint of decreasing the amount of the portion to be cut out and removed, the α is preferably equal to or smaller than 20 m.

The specific embodiment of the heat treatment performed in a state of being wound around the core member as described above is described below.

An atmosphere temperature for performing the heat treatment (hereinafter, referred to as a "heat treatment temperature") is preferably equal to or higher than 40° C. and more preferably equal to or higher than 50° C. On the other hand, from a viewpoint of preventing the excessive deformation, the heat treatment temperature is preferably equal to or lower than 75° C., more preferably equal to or lower than 70° C., and even more preferably equal to or lower than 65° C.

A weight absolute humidity of the atmosphere for performing the heat treatment is preferably equal to or greater than 0.1 g/kg Dry air and more preferably equal to or greater than 1 g/kg Dry air. The atmosphere in which the weight absolute humidity is in the range described above is preferable, because it can be prepared without using a special device for decreasing moisture. On the other hand, the weight absolute humidity is preferably equal to or smaller than 70 g/kg Dry air and more preferably equal to or smaller than 66 g/kg Dry air, from a viewpoint of preventing a deterioration in workability by dew condensation. The heat treatment time is preferably equal to or longer than 0.3 hours and more preferably equal to or longer than 0.5 hours. In addition, the heat treatment time is preferably equal to or shorter than 48 hours, from a viewpoint of production efficiency.

Regarding the control of the curvature of the magnetic tape in the longitudinal direction, as any value of the heat treatment temperature, heat treatment time, modulus of bending elasticity of a core for the heat treatment, and tension at the time of winding around the core for the heat treatment is large, the value of the curvature tends to further decrease.

Formation of Servo Pattern

A servo pattern can also be formed on the magnetic tape by a well-known method, in order to realize tracking control of a magnetic head of a magnetic recording and reproducing device and control of a running speed of the magnetic tape. The "formation of the servo pattern" can be "recording of a servo signal". The dimension information of the magnetic tape in the width direction during the running can be obtained using a servo signal, and the dimension of the magnetic tape in the width direction can be controlled by adjusting and changing the tension applied in the longitudinal direction of the magnetic tape according to the obtained dimension information.

The formation of the servo pattern will be described below.

The servo pattern is generally formed along a longitudinal direction of the magnetic tape. As a system of control using a servo signal (servo control), timing-based servo (TBS), amplitude servo, or frequency servo is used.

As shown in European Computer Manufacturers Association (ECMA)-319 (June 2001), a timing-based servo system is used in a magnetic tape based on a linear-tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. The servo system is a system of performing head tracking using a servo signal. In the invention and the specification, the "timing-based servo pattern" refers to a servo pattern that enables head tracking in a servo system of a timing-based servo system. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of servo patterns continuous in the longitudinal direction of the magnetic tape. A plurality of servo bands are normally provided on the magnetic tape. For example, the number thereof is 5 in the LTO tape. A region interposed between two adjacent servo bands is a data band. The data band is configured of a plurality of data tracks and each data track corresponds to each servo track.

In one embodiment, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively displaced in the longitudinal direction of the magnetic tape. Specifically, the position of the shifted specific servo stripe among the plurality of pairs of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 (June 2001) is used. In this staggered method, a plurality of the groups of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319 (June 2001), information showing the position in the longitudinal direction of the magnetic tape (also referred to as "Longitudinal Position (LPOS) information") is normally embedded in each servo band. This LPOS information is recorded so that the position of one pair of servo stripes is shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head generally includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo pattern to be formed. The width of each gap can be set as, for example, equal to or smaller than 1 µm, 1 to 10 µm, or equal to or greater than 10 µm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by applying the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing is opposite to each other. Accordingly, the output of the servo signal obtained by the reading of the servo pattern can be increased. As disclosed in JP2012-53940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

Usually, after the formation of the servo pattern, the magnetic tape is wound around the core of the magnetic tape container and accommodated in the magnetic tape container. As described above, the magnetic tape container is a magnetic tape cartridge in one aspect and a magnetic recording and reproducing device including a magnetic head in the other aspect.

Magnetic Head

In the invention and the specification, the "magnetic recording and reproducing device" means a device capable of performing at least one of the recording of data on the magnetic tape or the reproducing of data recorded on the magnetic tape. Such a device is generally called a drive and can be a tape drive for recording digital data. The magnetic tape container can be a magnetic tape cartridge in one aspect, and can be a magnetic recording and reproducing device including a magnetic head in the other aspect. The magnetic tape cartridge can be inserted into the magnetic recording and reproducing device, and the magnetic tape can be run in the magnetic recording and reproducing device to record data on the magnetic tape and/or reproduce the recorded data by the magnetic head. The magnetic head included in the magnetic recording and reproducing device can be a recording head capable of performing the recording of data on the magnetic tape, and can also be a reproducing head capable of performing the reproducing of data recorded on the magnetic tape. In addition, in the embodiment, the magnetic recording and reproducing device can include both of a recording head and a reproducing head as separate magnetic heads. In another embodiment, the magnetic head included in the magnetic recording and reproducing device may have a configuration in which both the recording element and the reproducing element are comprised in one magnetic head. As the reproducing head, a magnetic head (MR head) including a magnetoresistive (MR) element capable of reading information recorded on the magnetic tape with excellent sensitivity as the reproducing element is preferable. As the MR head, various well-known MR heads (for example, a Giant Magnetoresistive (GMR) head, or a Tunnel Magnetoresistive (TMR) head) can be used. In addition, the magnetic head which performs the recording of data and/or the reproducing of data may include a servo pattern reading element. Alternatively, as a head other than the magnetic head which performs the recording of data and/or the reproducing of data, a magnetic head (servo head) including a servo pattern reading element may be included in the magnetic recording and reproducing device. For example, the magnetic head which performs the recording of data and/or reproducing of the recorded data (hereinafter, also referred to as a "recording and reproducing head") can include two servo signal reading elements, and each of the two servo signal reading elements can read two adjacent servo bands with the data band interposed therebetween at the same time. One or a plurality of elements for data can be disposed between the two servo signal reading elements. The element for recording data (recording element) and the element for reproducing data (reproducing element) are collectively referred to as "elements for data".

By reproducing data using the reproducing element having a narrow reproducing element width as the reproducing element, the data recorded at high density can be reproduced with high sensitivity. From this viewpoint, the reproducing element width of the reproducing element is preferably 0.8 μm or less. The reproducing element width of the reproducing element can be, for example, 0.1 μm or more. However, it is also preferable to fall below this value from the above viewpoint.

On the other hand, as the reproducing element width decreases, a phenomenon such as reproducing failure due to off-track is more likely to occur. In order to suppress the occurrence of such a phenomenon, it is preferable to use a magnetic recording and reproducing device that controls the dimension of the magnetic tape in the width direction by adjusting and changing the tension applied in the longitudinal direction of the magnetic tape during the running.

Here, the "reproducing element width" refers to a physical dimension of the reproducing element width. Such physical dimensions can be measured with an optical microscope, a scanning electron microscope, or the like.

In a case of recording data and/or reproducing recorded data, first, head tracking can be performed using a servo signal. That is, as the servo signal reading element follows a predetermined servo track, the element for data can be controlled to pass on the target data track. The movement of the data track is performed by changing the servo track to be read by the servo signal reading element in the tape width direction.

In addition, the recording and reproducing head can perform the recording and/or reproducing with respect to other data bands. In this case, the servo signal reading element is moved to a predetermined servo band by using the UDIM information described above, and the tracking with respect to the servo band may be started.

Figure 8:
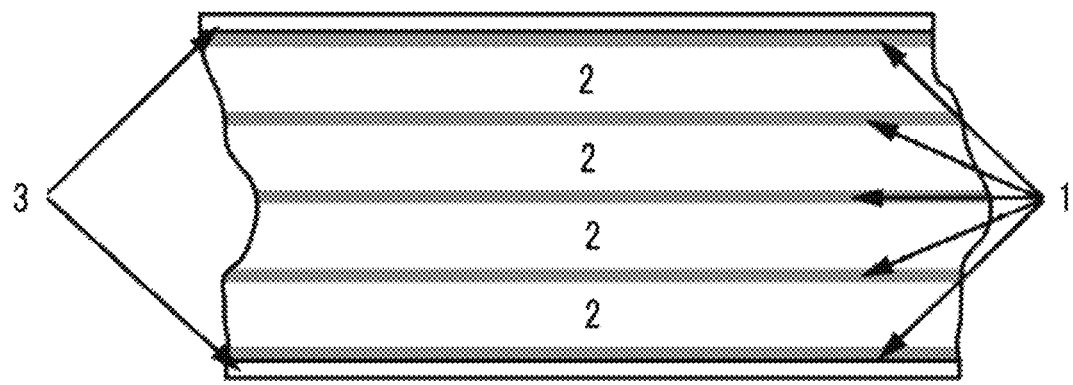
FIG. 8 shows an example of disposition of data bands and servo bands.
Figure 9:
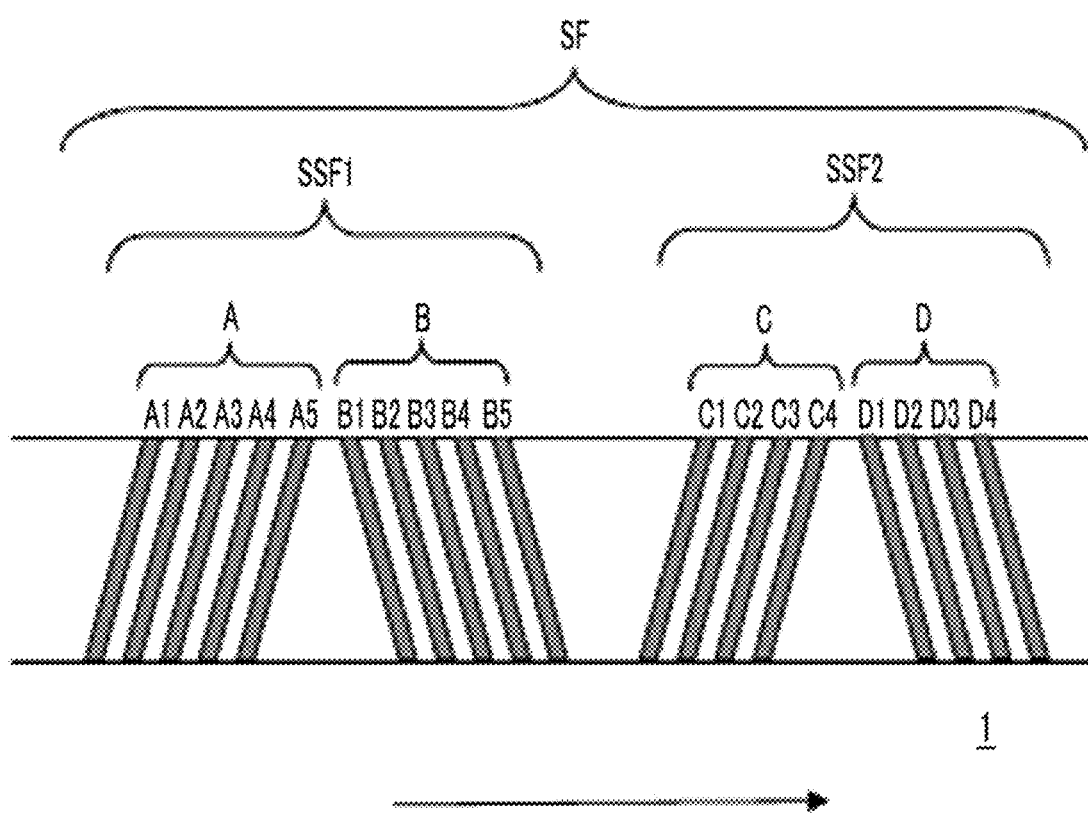
FIG. 9 shows a servo pattern disposition example of a linear-tape-open (LTO) Ultrium format tape.

FIG. 8 shows an example of disposition of data bands and servo bands. In FIG. 8, a plurality of servo bands 1 are disposed to be interposed between guide bands 3 in a magnetic layer of a magnetic tape T. A plurality of regions 2 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 9 are formed on a servo band, in a case of manufacturing a magnetic tape. Specifically, in FIG. 9, a servo frame SF on the servo band 1 is configured with a servo sub-frame 1 (SSF1) and a servo sub-frame 2 (SSF2). The servo sub-frame 1 is configured with an A burst (in FIG. 9, reference numeral A) and a B burst (in FIG. 9, reference numeral B). The A burst is configured with servo patterns A1 to A5 and the B burst is configured with servo patterns B1 to B5. Meanwhile, the servo sub-frame 2 is configured with a C burst (in FIG. 9, reference numeral C) and a D burst (in FIG. 9, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for identifying the servo frames. FIG. 9 shows one servo frame for explaining. However, in practice, in the magnetic layer of the magnetic tape in which the head tracking servo in the timing-based servo system is performed, a plurality of servo frames are disposed in each servo band in a running direction. In FIG. 9, an arrow shows the running direction. For example, an LTO Ultrium format tape generally includes 5,000 or more servo frames per a tape length of 1 m, in each servo band of the magnetic layer.

EXAMPLES

Hereinafter, the invention will be described with reference to examples. However, the invention is not limited to embodiments shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted. Further, "eq" described below indicates an equivalent which is a unit which cannot be converted into the SI unit system.

Non-Magnetic Support

In Table 1, "PET" in the column of the non-magnetic support indicates a polyethylene terephthalate support and "PEN" indicates a polyethylene naphthalate support.

Ferromagnetic Powder

In Table 1, "BaFe" in a column of the type of the ferromagnetic powder is a hexagonal barium ferrite powder having an average particle size (average plate diameter) of 21 nm.

In Table 1, "SrFe1" of the column of the type of ferromagnetic powder indicates a hexagonal strontium ferrite powder produced as follows.

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a melting temperature of 1,390° C., and a tap hole provided on the bottom of the platinum crucible was heated while stirring the melt, and the melt was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1,000 g of zirconia beads having a particle diameter of 1 mm, and 800 mL of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 18 nm, an activation volume was 902 $nm^3$, an anisotropy constant Ku was $2.2 \times 10^5$ $J/m^3$, and a mass magnetization σs was 49 $A \times m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained. The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the conditions of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector

Soller slit of incident beam and diffraction beam: 0.017 radians

Fixed angle of dispersion slit: ¼ degrees

Mask: 10 mm

Scattering prevention slit: ¼ degrees

Measurement mode: continuous

Measurement time per 1 stage: 3 seconds

Measurement speed: 0.017 degrees per second

Measurement step: 0.05 degree

In Table 1, "SrFe2" of the column of the type of ferromagnetic powder indicates a hexagonal strontium ferrite powder produced as follows.

1,725 g of $SrCO_3$, 666 g of $H_3BO_3$, 1,332 g of $Fe_2O_3$, 52 g of $Al(OH)_3$, 34 g of $CaCO_3$, and 141 g of $BaCO_3$ were weighed and mixed in a mixer to obtain a raw material mixture.

The obtained raw material mixture was dissolved in a platinum crucible at a melting temperature of 1,380° C., and a tap hole provided on the bottom of the platinum crucible was heated while stirring the melt, and the melt was tapped in a rod shape at approximately 6 g/sec. The tap liquid was rolled and cooled with a water cooling twin roller to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1,000 g of zirconia beads having a particle diameter of 1 mm, and 800 mL of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 19 nm, an activation volume was 1,102 $nm^3$, an anisotropy constant Ku was $2.0 \times 10^5$ $J/m^3$, and a mass magnetization σs was 50 $A \times m^2/kg$.

In Table 1, "ε-iron oxide" of the column of the type of ferromagnetic powder indicates a ε-iron oxide powder produced as follows.

4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1,000° C. was filled with the obtained precursor of ferromagnetic powder in the atmosphere and subjected to heat treatment for 4 hours.

The heat-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the heat-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide (ε-$Ga_{0.28}Co_{0.05}Ti_{0.05}Fe_{1.62}O_3$) was obtained. In addition, the X-ray diffraction analysis was performed under the same conditions as the conditions described regarding the hexagonal strontium ferrite powder SrFe1 in advance, and it was confirmed that the obtained ferromagnetic powder has a crystal structure of a single phase which is an ε phase not including a crystal structure of an a phase and a γ phase (ε-iron oxide type crystal structure) from the peak of the X-ray diffraction pattern.

Regarding the obtained (ε-iron oxide powder, an average particle size was 12 nm, an activation volume was 746 $nm^3$, an anisotropy constant Ku was $1.2 \times 10^5$ $J/m^3$, and a mass magnetization σs was 16 $A \times m^2/kg$.

The activation volume and the anisotropy constant Ku of the hexagonal strontium ferrite powder and the ε-iron oxide powder are values obtained by the method described above regarding each ferromagnetic powder by using an oscillation sample type magnetic-flux meter (manufactured by Toei Industry Co., Ltd.).

In addition, the mass magnetization σS is a value measured at the magnetic field strength of 1,194 kA/m (15 kOe) by using an oscillation sample type magnetic-flux meter (manufactured by Toei Industry Co., Ltd.).

Example 1

(1) List of Magnetic Layer Forming Composition
Magnetic Liquid
Ferromagnetic powder (see Table 1): 100.0 parts
$SO_3Na$ group-containing polyurethane resin: 14.0 parts
Weight-average molecular weight: 70,000, $SO_3Na$ group: 0.4 meq/g
Cyclohexanone: 150 parts
Methyl ethyl ketone: 150 parts
Abrasive solution A
Alumina abrasive (average particle size: 100 nm): 3.0 parts
Sulfonic acid group-containing polyurethane resin: 0.3 parts
Weight-average molecular weight: 70,000, $SO_3Na$ group: 0.3 meq/g
Cyclohexanone: 26.7 parts
Abrasive solution B
Diamond abrasive (average particle size: 100 nm): 1.0 part
Sulfonic acid group-containing polyurethane resin: 0.1 parts
Weight-average molecular weight: 70,000, $SO_3Na$ group: 0.3 meq/g
Cyclohexanone: 26.7 parts
Silica Sol
Colloidal silica (average particle size: 100 nm): 0.2 part
Methyl ethyl ketone: 1.4 parts
Other Components
Stearic acid: 2.0 parts
Butyl stearate: 10.0 parts
Polyisocyanate (CORONATE manufactured by Nippon Polyurethane Industry Co., Ltd.): 2.5 parts
Cyclohexanone: 200.0 parts
Methyl ethyl ketone: 200.0 parts
(2) List of Non-Magnetic Layer Forming Composition
Non-magnetic inorganic powder (α-iron oxide): 100.0 parts
Average particle size (average major axis length): 10 nm
Average acicular ratio: 1.9
Brunauer-emmett-teller (BET) specific surface area: 75 $m^2/g$
Carbon black: 25.0 parts
Average particle size: 20 nm
$SO_3Na$ group-containing polyurethane resin: 18.0 parts
Weight-average molecular weight: 70,000, $SO_3Na$ group: 0.2 meq/g
Stearic acid: 1.0 part
Cyclohexanone: 300.0 parts
Methyl ethyl ketone: 300.0 parts
(3) List of Back Coating Layer Forming Composition
Carbon black: 100.0 parts
BP-800 manufactured by Cabot Corporation, average particle size: 17 nm
$SO_3Na$ group-containing polyurethane resin ($SO_3Na$ group: 70 eq/ton): 20.0 parts
$OSO_3K$ group-containing vinyl chloride resin ($OSO_3K$ group: 70 eq/ton): 30.0 parts
Polyethyleneimine (manufactured by Nippon Shokubai Co., Ltd., number average molecular weight: 600): See Table 1
Stearic acid: see Table 1
Cyclohexanone: 140.0 parts
Methyl ethyl ketone: 170.0 parts
Butyl stearate: 2.0 parts
Stearic acid amide: 0.1 parts
(4) Manufacturing of Magnetic Tape and Magnetic Tape Cartridge
A magnetic liquid was prepared by dispersing the components of the magnetic liquid with a batch type vertical sand mill for 24 hours. As dispersion beads, zirconia beads having a bead diameter of 0.5 mm were used.

Regarding the abrasive solution, the above components of the abrasive solution A and the abrasive solution B were dispersed for 24 hours with a batch type ultrasonic device (20 kHz, 300 W), respectively, to obtain the abrasive solution A and the abrasive solution B.

The magnetic liquid, the abrasive solution A and the abrasive solution B were mixed with the above silica sol and other components, and then dispersed in a batch type ultrasonic device (20 kHz, 300 W) for 30 minutes. After that, the obtained mixed solution was filtered by using a filter having a hole diameter of 0.5 µm, and the magnetic layer forming composition was prepared.

For the non-magnetic layer forming composition, the components were dispersed by using a batch type vertical sand mill for 24 hours. As dispersion beads, zirconia beads having a bead diameter of 0.1 mm were used. The obtained dispersion liquid was filtered with a filter having a hole diameter of 0.5 µm, and a non-magnetic layer forming composition was prepared.

Regarding the back coating layer forming composition, the above components were kneaded with a continuous kneader and then dispersed using a sand mill. After adding 40.0 parts of polyisocyanate (Coronate L manufactured by Nippon Polyurethane Industry Co., Ltd.) and 1000.0 parts of methyl ethyl ketone to the obtained dispersion liquid, the mixture was filtered using a filter having a hole diameter of 1 µm to prepare a back coating layer forming composition.

The non-magnetic layer forming composition prepared in the section was applied to a surface of a support which is a type shown in Table 1 having a thickness of 4.1 µm so that the thickness after the drying becomes 0.7 µm and was dried to form a non-magnetic layer.

Then, the magnetic layer forming composition prepared as described above was applied onto the non-magnetic layer so that the thickness after the drying is 0.1 µm, and a coating layer was formed.

After that, a homeotropic alignment process was performed by applying a magnetic field having a magnetic field strength of 0.3 T in a vertical direction with respect to a surface of a coating layer, while the coating layer of the magnetic layer forming composition is wet. Then, the drying was performed to form the magnetic layer.

After that, the back coating layer forming composition prepared as described above was applied to the surface of the support made of polyethylene naphthalate on a side opposite to the surface where the non-magnetic layer and the magnetic layer were formed, so that the thickness after the drying becomes 0.3 µm, and was dried to form a back coating layer.

After that, a surface smoothing treatment (calender process) was performed by using a calender roll configured of only a metal roll, at a speed of 100 m/min, linear pressure of 300 kg/cm), and a calender temperature (surface temperature of a calender roll) of 90° C. By doing so, a long magnetic tape raw material was obtained.

Then, after the heat treatment for 36 hours in an environment of an atmosphere temperature of 70° C., a long magnetic tape raw material was slit into a ½ inches width to obtain a magnetic tape. By recording a servo signal on the magnetic layer of the obtained magnetic tape with a commercially available servo writer, a magnetic tape having a servo pattern (timing-based servo pattern) was obtained in an arrangement according to the LTO (Linear Tape-Open) Ultrium format. By recording a servo signal on a magnetic layer of the obtained magnetic tape with a commercially available servo writer, the magnetic tape including a data band, a servo band, and a guide band in the disposition according to a linear-tape-open (LTO) Ultrium format, and including a servo pattern (timing-based servo pattern) having the disposition and shape according to the LTO Ultrium format on the servo band was obtained. The servo pattern formed by doing so is a servo pattern disclosed in Japanese Industrial Standards (JIS) X6175:2006 and Standard ECMA-319 (June 2001).

The magnetic tape (length of 960 m) after the servo signal recording was wound around the core for heat treatment, and the heat treatment was performed in a state of being wound around this core. As the core for heat treatment, a solid core member (outer diameter: 50 mm) formed of a resin and having a value of a modulus of bending elasticity shown in Table 1 was used, and the tension in a case of the winding was set as a value shown in Table 1. The heat treatment temperature and heat treatment time in the heat treatment were set to values shown in Table 1. The weight absolute humidity in the atmosphere in which the heat treatment was performed was 10 g/kg Dry air.

After the heat treatment, the magnetic tape and the core for heat treatment were sufficiently cooled, the magnetic tape was detached from the core for heat treatment and wound around the core for temporary winding, and then, the magnetic tape having the final product length (950 m) was wound around the reel of the magnetic tape cartridge from the core for temporary winding. The remaining length of 10 m was cut out and the leader tape based on section 9 of Standard European Computer Manufacturers Association (ECMA)-319 (June 2001) Section 3 was bonded to the terminal of the cut side by using a commercially available splicing tape. As the core for temporary winding, a solid core member having the same outer diameter and formed of the same material as the core for heat treatment was used, and the tension in a case of winding was set as 0.6 N.

As the magnetic tape cartridge accommodating the magnetic tape described above, a single reel type magnetic tape cartridge having the configuration shown in FIG. 1 was used. The reel hub of this magnetic tape cartridge is a single-layer structure reel hub (thickness: 2.5 mm, outer diameter: 44 mm) obtained by injection molding glass fiber reinforced polycarbonate. The glass fiber content of this glass fiber reinforced polycarbonate is the value shown in Table 1. A part of the glass fiber reinforced polycarbonate for injection molding was sampled, and according to JIS K 7171: 2016 section 6.3.1 (preparation from molding material), it is described in JIS section 6.1.2. The recommended test pieces were prepared, and the modulus of bending elasticity (arithmetic mean of 5 test pieces) was calculated according to the same JIS. In the examples and comparative examples described below, the modulus of bending elasticity of the reel hub material was determined by the above method. The modulus of bending elasticity of the core for heat treatment shown in Table 1 is also a value obtained in the same manner.

The magnetic tape was wound around the reel hub of the magnetic tape cartridge while applying a tension of 1.0 N or less in the longitudinal direction of the tape, and the magnetic tape was housed in the magnetic tape cartridge.

As described above, a single reel type magnetic tape cartridge of Example 1 in which a magnetic tape having a length of 950 m was wound around a reel was manufactured.

It can be confirmed by the following method that the back coating layer of the magnetic tape contains a compound formed of polyethyleneimine and stearic acid and having an ammonium salt structure of an alkyl ester anion represented by Formula 1.

A sample is cut out from a magnetic tape, and X-ray photoelectron spectroscopy analysis is performed on the surface of the back coating layer (measurement area: 300 μm×700 μm) using an ESCA device. Specifically, wide scan measurement is performed by the ESCA device under the following measurement conditions. In the measurement results, peaks are confirmed at a position of a binding energy of the ester anion and a position of a binding energy of the ammonium cation.

Device: AXIS-ULTRA manufactured by Shimadzu Corporation

Excited X-ray source: Monochromatic Al-Kα ray
Scan range: 0 to 1,200 eV
Path energy: 160 eV
Energy resolution: 1 eV/step
Capturing Time: 100 ms/step
Number of times of integration: 5

In addition, a sample piece having a length of 3 cm is cut out from the magnetic tape, and attenuated total reflection-fourier transform-infrared spectrometer (ATR-FT-IR) measurement (reflection method) is performed on the surface of the back coating layer, and, in the measurement result, the absorption is confirmed on a wave number corresponding to absorption of COO$^-$ (1,540 cm$^{-1}$ or 1,430 cm$^{-1}$) and a wave number corresponding to the absorption of the ammonium cation (2,400 cm$^{-1}$).

The above steps were repeated to manufacture three magnetic tape cartridges, one magnetic tape cartridge was used for the following (5), another magnetic tape cartridge was used for the following (9), and still another magnetic tape cartridge was used for the magnetic tape extracted from the magnetic tape cartridge as in following (6) to (8).

(5) Measurement of Roundness and Reference Circle Center Position Deviation

The roundness of the trajectory of one rotation drawn by the magnetic tape, in a case of drawing the magnetic tape wound around the reel (core) of the magnetic tape cartridge from the core, was obtained by the method described above by using LK-G85 and LK-GD500 manufactured by KEYENCE as the laser displacement meter and CZ-H35S and CZ-C21A manufactured by KEYENCE as the optical discrimination sensor, and a maximum value of the deviation of the center position of the average minimum region reference circle (reference circle center position deviation) was further obtained. The measurement was carried out by extracting the reel around which the magnetic tape was wound from the case of the magnetic tape cartridge and transferring the reel to the cartridge case having the opening portion as described above.

(6) Number of Recesses Having Equivalent Circle Diameter of 0.20 μm to 0.50 μm Existing on Surface of Magnetic Layer (Area 40 μm×40 μm)

The following conditions were used as measurement conditions of the AFM, and the number of recesses having the equivalent circle diameter in the range described above (per 40 μm×40 μm area) was obtained regarding the surface of the magnetic layer of the magnetic tape by the method described above.

The measurement regarding a region of the surface of the magnetic layer of the magnetic tape having an area of 40 μm×40 μm is performed with an AFM (Nanoscope 5 manufactured by BRUKER Corporation) in a peak force tapping mode. SCANASYST-AIR manufactured by BRUKER Corporation is used as a probe, a resolution is set as 512 pixels×512 pixels, and a scan speed is set by the measurement regarding 1 screen (512 pixels×512 pixels) for 512 seconds.

(7) Curvature of Magnetic Tape in Longitudinal Direction

The magnetic tape was taken out from the magnetic tape cartridge, and the curvature of the magnetic tape in the longitudinal direction was determined by the method described above.

(8) Total Thickness of Magnetic Tape (Tape Thickness)

Ten tape samples (for example, 5 cm in length) are cut out from any portion of the magnetic tape, and the tape samples are stacked to measure the thickness. The thickness was measured using a digital thickness gauge of a Millimar 1240 compact amplifier manufactured by MARH and a Millimar 1301 induction probe. The value (thickness per tape sample) obtained by calculating ¹/₁₀ of the measured thickness was defined as the tape thickness. For the magnetic tape, the tape thickness was 5.2 μm. The tape thickness was obtained in the same manner for Examples and Comparative Examples which will be described later, and the tape thickness was 5.2 μm in each case.

(9) Measurement of Transfer Rate

The magnetic tape cartridge was inserted into the magnetic recording and reproducing device, and data was recorded on the magnetic tape and the recorded data was reproduced. As the magnetic recording and reproducing device, a magnetic recording and reproducing device having the configuration shown in FIG. 4 which has 32 or more channels of reproducing elements and recording elements with a reproducing element width of 0.8 μm, and includes a recording and reproducing unit including servo signal reading elements on both sides thereof.

After acclimatizing the magnetic tape cartridge and the magnetic recording and reproducing device to the measurement environment (atmosphere temperature of 20° C. to 25° C., relative humidity of 40% to 60%) for 1 day or longer, the recording and reproducing were performed over the entire tape length and width. During the recording and reproducing described above, the maximum capacity of the magnetic tape was recorded and reproduced using drive control software. In addition, during the recording and reproducing described above, a tension applied in the longitudinal direction of the magnetic tape was changed due to tension adjustment performed by the control device of the magnetic recording and reproducing device. For the recording and reproducing described above, the transfer rate was calculated as the capacity (MB/sec) recorded or reproduced per unit time by dividing the "recorded or reproduced capacity" by the "time required for recording or reproducing". In a case where the value calculated by dividing the recorded capacity by the time required for recording is different from the value obtained by dividing the reproduced capacity by the time required for reproducing, a lower value was adopted as the transfer rate. Table 1 shows the transfer rate as a relative value with the maximum transfer rate of a combination of the magnetic recording and reproducing device and the magnetic tape of 100.0%.

The maximum transfer rate is obtained, for example, by the following method.

Using LTO-G8 (Generation8) media, LTO-8 drive, and free software (IBM IBM Tape Diagnostic Tool-Graphical Edition) manufactured by IBM, the "Read And Write Tests" command is used to record and reproduce the maximum capacity, and "DataRate" can be obtained by reading the obtained log data file. In a case of LTO-G8 media (uncompressed, full-height drive), a transfer rate of 100.0%=360 MB/sec can be obtained.

Examples 2 to 34 and Comparative Examples 1 to 19

A magnetic tape cartridge was manufactured and various evaluations were performed in the same manner as in Example 1, except that the items in Table 1 were changed as shown in Table 1.

The result described above is shown in Table 1 (Tables 1-1 and 1-2).

TABLE 1-1

|  | Ferromagnetic powder | Non-magnetic powder | Back coating layer forming composition | | Magnetic layer Number of recesses having equivalent circle diameter of 0.20 μm to 0.50 μm (per area 40 μm × 40 μm) | Reel hub material | |
|---|---|---|---|---|---|---|---|
|  |  |  | Polyethyleneimine | Stearic acid |  | Modulus of bending elasticity | Content of glass fiber |
| Example 1 | BaFe | PET | 0.2 parts | 0.4 parts | 500 | 5 GPa | 15% |
| Example 2 | BaFe | PET | 0.3 parts | 0.5 parts | 400 | 5 GPa | 15% |
| Example 3 | BaFe | PET | 0.3 parts | 0.7 parts | 300 | 5 GPa | 15% |
| Example 4 | BaFe | PET | 0.5 parts | 1.0 part | 200 | 5 GPa | 15% |
| Example 5 | BaFe | PET | 1.0 part | 2.0 parts | 100 | 5 GPa | 15% |
| Example 6 | BaFe | PET | 2.7 parts | 5.3 parts | 10 | 5 GPa | 15% |
| Example 7 | BaFe | PET | 0.2 parts | 0.4 parts | 500 | 6 GPa | 20% |
| Example 8 | BaFe | PET | 0.3 parts | 0.5 parts | 400 | 6 GPa | 20% |
| Example 9 | BaFe | PET | 0.3 parts | 0.7 parts | 300 | 6 GPa | 20% |
| Example 10 | BaFe | PET | 0.5 parts | 1.0 part | 200 | 6 GPa | 20% |
| Example 11 | BaFe | PET | 1.0 part | 2.0 parts | 100 | 6 GPa | 20% |
| Example 12 | BaFe | PET | 2.7 parts | 5.3 parts | 10 | 6 GPa | 20% |
| Example 13 | BaFe | PET | 0.2 parts | 0.4 parts | 500 | 8 GPa | 30% |
| Example 14 | BaFe | PET | 0.3 parts | 0.5 parts | 400 | 8 GPa | 30% |
| Example 15 | BaFe | PET | 0.3 parts | 0.7 parts | 300 | 8 GPa | 30% |
| Example 16 | BaFe | PET | 0.5 parts | 1.0 part | 200 | 8 GPa | 30% |
| Example 17 | BaFe | PET | 1.0 part | 2.0 parts | 100 | 8 GPa | 30% |
| Example 18 | BaFe | PET | 2.7 parts | 5.3 parts | 10 | 8 GPa | 30% |
| Example 19 | BaFe | PEN | 0.2 parts | 0.4 parts | 500 | 8 GPa | 30% |
| Example 20 | BaFe | PEN | 0.3 parts | 0.5 parts | 400 | 8 GPa | 30% |
| Example 21 | BaFe | PEN | 0.3 parts | 0.7 parts | 300 | 8 GPa | 30% |
| Example 22 | BaFe | PEN | 0.5 parts | 1.0 part | 200 | 8 GPa | 30% |
| Example 23 | BaFe | PEN | 1.0 part | 2.0 parts | 100 | 8 GPa | 30% |
| Example 24 | BaFe | PEN | 2.7 parts | 5.3 parts | 10 | 8 GPa | 30% |
| Example 25 | SrFe1 | PET | 2.7 parts | 5.3 parts | 10 | 8 GPa | 30% |
| Example 26 | SrFe2 | PET | 2.7 parts | 5.3 parts | 10 | 8 GPa | 30% |
| Example 27 | ε-iron Oxide | PET | 2.7 parts | 5.3 parts | 10 | 8 GPa | 30% |
| Example 28 | BaFe | PET | 0.2 parts | 0.4 parts | 500 | 8 GPa | 30% |
| Example 29 | BaFe | PET | 0.3 parts | 0.5 parts | 400 | 8 GPa | 30% |
| Example 30 | BaFe | PET | 0.3 parts | 0.7 parts | 300 | 8 GPa | 30% |
| Example 31 | BaFe | PET | 0.5 parts | 1.0 part | 200 | 8 GPa | 30% |
| Example 32 | BaFe | PET | 1.0 part | 2.0 parts | 100 | 8 GPa | 30% |
| Example 33 | BaFe | PET | 2.7 parts | 5.3 parts | 10 | 8 GPa | 30% |
| Example 34 | BaFe | PET | 2.7 parts | 5.3 parts | 10 | 8 GPa | 30% |

|  | Heat treatment | | | | Curvature in longitudinal direction | Roundness [μm] | Reference circle center position deviation (Deviation of center position of average minimum region reference circle) [μm] | Transfer rate [%] |
|---|---|---|---|---|---|---|---|---|
|  | Heat treatment temperature | Heat treatment time | Modulus of bending elasticity of core for heat treatment | Tension during winding around core for heat treatment |  |  |  |  |
| Example 1 | 50° C. | 5 hours | 0.5 GPa | 0.6N | 5 mm/m | 99 | 99 | 99.0 |
| Example 2 | 50° C. | 5 hours | 0.5 GPa | 0.6N | 5 mm/m | 95 | 97 | 99.1 |
| Example 3 | 50° C. | 5 hours | 0.5 GPa | 0.6N | 5 mm/m | 96 | 90 | 99.1 |
| Example 4 | 50° C. | 5 hours | 0.5 GPa | 0.6N | 5 mm/m | 97 | 98 | 99.0 |
| Example 5 | 50° C. | 5 hours | 0.5 GPa | 0.6N | 5 mm/m | 95 | 91 | 99.0 |
| Example 6 | 50° C. | 5 hours | 0.5 GPa | 0.6N | 5 mm/m | 93 | 95 | 99.1 |
| Example 7 | 50° C. | 5 hours | 0.5 GPa | 0.6N | 5 mm/m | 80 | 90 | 99.3 |
| Example 8 | 50° C. | 5 hours | 0.5 GPa | 0.6N | 5 mm/m | 75 | 97 | 99.3 |
| Example 9 | 50° C. | 5 hours | 0.5 GPa | 0.6N | 5 mm/m | 77 | 98 | 99.2 |
| Example 10 | 50° C. | 5 hours | 0.5 GPa | 0.6N | 5 mm/m | 78 | 100 | 99.2 |

TABLE 1-1-continued

| | | | | | | | | |
|---|---|---|---|---|---|---|---|---|
| Example 11 | 50° C. | 5 hours | 0.5 GPa | 0.6N | 5 mm/m | 76 | 95 | 99.3 |
| Example 12 | 50° C. | 5 hours | 0.5 GPa | 0.6N | 5 mm/m | 73 | 90 | 99.4 |
| Example 13 | 50° C. | 5 hours | 0.5 GPa | 0.6N | 5 mm/m | 52 | 89 | 99.5 |
| Example 14 | 50° C. | 5 hours | 0.5 GPa | 0.6N | 5 mm/m | 50 | 98 | 99.6 |
| Example 15 | 50° C. | 5 hours | 0.5 GPa | 0.6N | 5 mm/m | 51 | 91 | 99.5 |
| Example 16 | 50° C. | 5 hours | 0.5 GPa | 0.6N | 5 mm/m | 50 | 93 | 99.5 |
| Example 17 | 50° C. | 5 hours | 0.5 GPa | 0.6N | 5 mm/m | 51 | 99 | 99.6 |
| Example 18 | 50° C. | 5 hours | 0.5 GPa | 0.6N | 5 mm/m | 48 | 90 | 99.5 |
| Example 19 | 50° C. | 5 hours | 0.5 GPa | 0.6N | 5 mm/m | 54 | 95 | 99.5 |
| Example 20 | 50° C. | 5 hours | 0.5 GPa | 0.6N | 5 mm/m | 51 | 90 | 99.6 |
| Example 21 | 50° C. | 5 hours | 0.5 GPa | 0.6N | 5 mm/m | 53 | 85 | 99.6 |
| Example 22 | 50° C. | 5 hours | 0.5 GPa | 0.6N | 5 mm/m | 50 | 88 | 99.5 |
| Example 23 | 50° C. | 5 hours | 0.5 GPa | 0.6N | 5 mm/m | 49 | 90 | 99.5 |
| Example 24 | 50° C. | 5 hours | 0.5 GPa | 0.6N | 5 mm/m | 47 | 98 | 99.5 |
| Example 25 | 50° C. | 5 hours | 0.5 GPa | 0.6N | 5 mm/m | 51 | 91 | 99.7 |
| Example 26 | 50° C. | 5 hours | 0.5 GPa | 0.6N | 5 mm/m | 49 | 93 | 99.5 |
| Example 27 | 50° C. | 5 hours | 0.5 GPa | 0.6N | 5 mm/m | 49 | 85 | 99.6 |
| Example 28 | 50° C. | 5 hours | 0.8 GPa | 0.6N | 4 mm/m | 50 | 75 | 100.0 |
| Example 29 | 50° C. | 5 hours | 0.8 GPa | 0.6N | 4 mm/m | 49 | 79 | 100.0 |
| Example 30 | 50° C. | 5 hours | 0.8 GPa | 0.6N | 4 mm/m | 51 | 80 | 100.0 |
| Example 31 | 50° C. | 5 hours | 0.8 GPa | 0.6N | 4 mm/m | 50 | 70 | 100.0 |
| Example 32 | 50° C. | 5 hours | 0.8 GPa | 0.6N | 4 mm/m | 49 | 74 | 100.0 |
| Example 33 | 50° C. | 5 hours | 0.8 GPa | 0.6N | 4 mm/m | 52 | 70 | 100.0 |
| Example 34 | 70° C. | 10 hours | 0.8 GPa | 0.8N | 0 mm/m | 45 | 48 | 100.0 |

TABLE 1-2

| | Ferromagnetic powder | Non-magnetic powder | Back coating layer forming composition | | Magnetic layer Number of recesses having equivalent circle diameter of 0.20 μm to 0.50 μm (per area 40 μm × 40 μm) | Reel hub material | |
|---|---|---|---|---|---|---|---|
| | | | Polyethyleneimine | Stearic acid | | Modulus of bending elasticity | Content of glass fiber |
| Comparative Example 1 | BaFe | PET | 0.0 parts | 0.0 parts | 2000 | 3 GPa | 10% |
| Comparative Example 2 | BaFe | PET | 0.0 parts | 0.1 parts | 1500 | 3 GPa | 10% |
| Comparative Example 3 | BaFe | PET | 0.1 parts | 0.1 parts | 1000 | 3 GPa | 10% |
| Comparative Example 4 | BaFe | PET | 0.2 parts | 0.4 parts | 700 | 3 GPa | 10% |
| Comparative Example 5 | BaFe | PET | 4.0 parts | 8.0 parts | 5 | 3 GPa | 10% |
| Comparative Example 6 | BaFe | PET | 5.3 parts | 10.7 parts | 3 | 3 GPa | 10% |
| Comparative Example 7 | BaFe | PEN | 0.0 parts | 0.0 parts | 2000 | 3 GPa | 10% |
| Comparative Example 8 | BaFe | PEN | 0.0 parts | 0.1 parts | 1500 | 3 GPa | 10% |
| Comparative Example 9 | BaFe | PEN | 0.1 parts | 0.1 parts | 1000 | 3 GPa | 10% |
| Comparative Example 10 | BaFe | PEN | 0.2 parts | 0.4 parts | 700 | 3 GPa | 10% |
| Comparative Example 11 | BaFe | PEN | 4.0 parts | 8.0 parts | 5 | 3 GPa | 10% |
| Comparative Example 12 | BaFe | PEN | 5.3 parts | 10.7 parts | 3 | 3 GPa | 10% |
| Comparative Example 13 | BaFe | PET | 2.7 parts | 5.3 parts | 10 | 3 GPa | 10% |
| Comparative Example 14 | BaFe | PET | 0.0 parts | 0.0 parts | 2000 | 5 GPa | 15% |
| Comparative Example 15 | BaFe | PET | 0.0 parts | 0.1 parts | 1500 | 5 GPa | 15% |
| Comparative Example 16 | BaFe | PET | 0.1 parts | 0.1 parts | 1000 | 5 GPa | 15% |
| Comparative Example 17 | BaFe | PET | 0.2 parts | 0.4 parts | 700 | 5 GPa | 15% |
| Comparative Example 18 | BaFe | PET | 4.0 parts | 8.0 parts | 5 | 5 GPa | 15% |
| Comparative Example 19 | BaFe | PET | 5.3 parts | 10.7 parts | 3 | 5 GPa | 15% |

| | Heat treatment | | | | | | Reference circle center position deviation (Deviation of center position of average minimum region reference circle) [μm] | Transfer rate [%] |
|---|---|---|---|---|---|---|---|---|
| | Heat treatment temperature | Heat treatment time | Modulus of bending elasticity of core for heat treatment | Tension during winding around core for heat treatment | Curvature in longitudinal direction | Roundness [μm] | | |
| Comparative Example 1 | 50° C. | 5 hours | 0.5 GPa | 0.6N | 5 mm/m | 155 | 145 | 94.1 |
| Comparative Example 2 | 50° C. | 5 hours | 0.5 GPa | 0.6N | 5 mm/m | 153 | 150 | 94.0 |
| Comparative Example 3 | 50° C. | 5 hours | 0.5 GPa | 0.6N | 5 mm/m | 150 | 152 | 93.9 |

TABLE 1-2-continued

| | | | | | | | | |
|---|---|---|---|---|---|---|---|---|
| Comparative Example 4 | 50° C. | 5 hours | 0.5 GPa | 0.6N | 5 mm/m | 151 | 148 | 94.1 |
| Comparative Example 5 | 50° C. | 5 hours | 0.5 GPa | 0.6N | 5 mm/m | 145 | 141 | 94.0 |
| Comparative Example 6 | 50° C. | 5 hours | 0.5 GPa | 0.6N | 5 mm/m | 144 | 146 | 93.9 |
| Comparative Example 7 | 50° C. | 5 hours | 0.5 GPa | 0.6N | 5 mm/m | 155 | 135 | 94.0 |
| Comparative Example 8 | 50° C. | 5 hours | 0.5 GPa | 0.6N | 5 mm/m | 150 | 140 | 94.1 |
| Comparative Example 9 | 50° C. | 5 hours | 0.5 GPa | 0.6N | 5 mm/m | 152 | 142 | 94.1 |
| Comparative Example 10 | 50° C. | 5 hours | 0.5 GPa | 0.6N | 5 mm/m | 151 | 120 | 93.9 |
| Comparative Example 11 | 50° C. | 5 hours | 0.5 GPa | 0.6N | 5 mm/m | 143 | 135 | 94.0 |
| Comparative Example 12 | 50° C. | 5 hours | 0.5 GPa | 0.6N | 5 mm/m | 145 | 148 | 94.1 |
| Comparative Example 13 | 50° C. | 5 hours | 0.5 GPa | 0.6N | 5 mm/m | 122 | 119 | 95.0 |
| Comparative Example 14 | 50° C. | 5 hours | 0.5 GPa | 0.6N | 5 mm/m | 120 | 145 | 95.1 |
| Comparative Example 15 | 50° C. | 5 hours | 0.5 GPa | 0.6N | 5 mm/m | 118 | 136 | 95.0 |
| Comparative Example 16 | 50° C. | 5 hours | 0.5 GPa | 0.6N | 5 mm/m | 115 | 129 | 95.2 |
| Comparative Example 17 | 50° C. | 5 hours | 0.5 GPa | 0.6N | 5 mm/m | 117 | 146 | 95.0 |
| Comparative Example 18 | 50° C. | 5 hours | 0.5 GPa | 0.6N | 5 mm/m | 112 | 151 | 94.9 |
| Comparative Example 19 | 50° C. | 5 hours | 0.5 GPa | 0.6N | 5 mm/m | 110 | 147 | 95.0 |

As shown in Table 1, in the examples, recording and reproduction at a higher transfer rate than in the comparative example was possible.

A magnetic tape cartridge was manufactured by the method described above as in Example 1 except that the homeotropic alignment process was not performed in a case of manufacturing the magnetic tape.

A sample piece was cut out from the magnetic tape taken out from the magnetic tape cartridge. For this sample piece, a vertical squareness ratio SQ was obtained by the method described above using a TM-TRVSM5050-SMSL type manufactured by Tamagawa Seisakusho Co., Ltd. as an oscillation sample type magnetic-flux meter and it was 0.55.

The magnetic tape was also taken out from the magnetic tape cartridge of Example 1, and the vertical squareness ratio was obtained in the same manner for the sample piece cut out from the magnetic tape, and it was 0.60.

The magnetic tapes taken out from the above two magnetic tape cartridges were attached to each of the ½-inch reel testers, and the electromagnetic conversion characteristics (signal-to-noise ratio (SNR)) were evaluated by the following methods. As a result, regarding the magnetic tape taken out from the magnetic tape cartridge of Example 1, a value of SNR 2 dB higher than that of the magnetic tape manufactured without the homeotropic alignment process was obtained.

In an environment of a temperature of 23° C. and a relative humidity of 50%, a tension of 0.7 N was applied in the longitudinal direction of the magnetic tape, and recording and reproduction were performed for 10 passes. A relative speed of the magnetic head and the magnetic tape was set as 6 m/sec. The recording was performed by using a metal-in-gap (MIG) head (gap length of 0.15 μm, track width of 1.0 μm) as the recording head and by setting a recording current as an optimal recording current of each magnetic tape. The reproduction was performed using a giant-magnetoresistive (GMR) head (element thickness of 15 nm, shield interval of 0.1 μm, reproducing element width of 0.8 μm) as the reproduction head. A signal having a linear recording density of 300 kfci was recorded, and the reproduced signal was measured with a spectrum analyzer manufactured by ShibaSoku Co., Ltd. In addition, the unit kfci is a unit of linear recording density (cannot be converted to SI unit system). As the signal, a sufficiently stabilized portion of the signal after starting the running of the magnetic tape was used.

One embodiment of the invention is advantageous in a technical field of various data storages such as backup or archives.

What is claimed is:

1. A magnetic tape container comprising:
a core around which a magnetic tape is wound,
wherein the magnetic tape includes a non-magnetic support, and a magnetic layer including a ferromagnetic powder,
a roundness of a trajectory of one rotation drawn by the magnetic tape in a case where the wound magnetic tape is drawn out from the core is 100 μm or less as an arithmetic mean of measured values at three points of the magnetic tape in a width direction,
a modulus of bending elasticity of a material constituting at least an outer peripheral side surface layer portion of a hub of the core around which the magnetic tape is wound is 5 GPa or more, and
a number of recesses having an equivalent circle diameter of 0.20 μm to 0.50 μm existing on a surface of the magnetic layer is 10 to 500 per 40 μm×40 μm area.

2. The magnetic tape container according to claim 1, wherein the magnetic tape has a servo pattern in the magnetic layer.

3. The magnetic tape container according to claim 1, wherein an entire length of the magnetic tape is 200 m or more.

4. The magnetic tape container according to claim 1, wherein the roundness is 50 μm or less.

5. The magnetic tape container according to claim 1, wherein a maximum value of a deviation of a center position of an average minimum region reference circle of the trajectory of one rotation drawn by the magnetic tape in a case where the wound magnetic tape is drawn out from the core is 100 μm or less for the three points.

6. The magnetic tape container according to claim 5, wherein the maximum value of the deviation of the center position of the average minimum region reference circle is 80 μm or less for the three points.

7. The magnetic tape container according to claim 1, wherein the magnetic tape further includes a non-magnetic layer including a non-magnetic powder between the non-magnetic support and the magnetic layer.

8. The magnetic tape container according to claim 1, wherein the magnetic tape further includes a back coating layer including a non-magnetic powder on a surface side of the non-magnetic support opposite to a surface side on which the magnetic layer is provided.

9. The magnetic tape container according to claim 1, wherein the magnetic tape container is a magnetic tape cartridge.

10. The magnetic tape container according to claim 9, wherein the roundness is 50 μm or less.

11. The magnetic tape container according to claim 9, wherein a maximum value of a deviation of a center position of an average minimum region reference circle of the trajectory of one rotation drawn by the magnetic tape in a case where the wound magnetic tape is drawn out from the core is 100 µm or less for the three points.

12. The magnetic tape container according to claim 11, wherein the maximum value of the deviation of the center position of the average minimum region reference circle is 80 µm or less for the three points.

13. The magnetic tape container according to claim 1, wherein the magnetic tape container is a magnetic recording and reproducing device, and further includes a magnetic head.

14. The magnetic tape container according to claim 13, wherein the roundness is 50 µm or less.

15. The magnetic tape container according to claim 13, wherein a maximum value of a deviation of a center position of an average minimum region reference circle of the trajectory of one rotation drawn by the magnetic tape in a case where the wound magnetic tape is drawn out from the core is 100 µm or less for the three points.

16. The magnetic tape container according to claim 15, wherein the maximum value of the deviation of the center position of the average minimum region reference circle is 80 µm or less for the three points.

17. The magnetic tape container according to claim 13, wherein the magnetic head includes a reproducing element having a reproducing element width of 0.8 µm or less.

18. The magnetic tape container according to claim 13, further comprising:
a tension adjusting mechanism which adjusts a tension applied in a longitudinal direction of the magnetic tape which runs in the magnetic recording and reproducing device.

19. The magnetic tape container according to claim 1, wherein the magnetic tape has a vertical squareness ratio of 0.60 or more.

20. The magnetic tape container according to claim 1, wherein a material constituting the hub of the core is a glass fiber reinforced resin and a content of the glass fiber in the glass fiber reinforced resin is 15% by mass or more.

* * * * *